(12) United States Patent
Boström et al.

(10) Patent No.: US 12,063,115 B2
(45) Date of Patent: Aug. 13, 2024

(54) SYSTEMS AND METHODS TO REDUCE CONSECUTIVE PACKET LOSS FOR DELAY CRITICAL TRAFFIC

(71) Applicant: Telefonaktiebolaget LM Ericsson (PUBL), Stockholm (SE)

(72) Inventors: Lisa Boström, Solna (SE); Fredrik Alriksson, Sundbyberg (SE); Ying Sun, Täby (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 253 days.

(21) Appl. No.: 17/427,512

(22) PCT Filed: Feb. 13, 2020

(86) PCT No.: PCT/SE2020/050157
§ 371 (c)(1),
(2) Date: Jul. 30, 2021

(87) PCT Pub. No.: WO2020/167231
PCT Pub. Date: Aug. 20, 2020

(65) Prior Publication Data
US 2022/0182185 A1 Jun. 9, 2022

Related U.S. Application Data

(60) Provisional application No. 62/805,477, filed on Feb. 14, 2019, provisional application No. 62/804,896, filed on Feb. 13, 2019.

(51) Int. Cl.
*H04L 1/08* (2006.01)
*H04L 1/1607* (2023.01)
(Continued)

(52) U.S. Cl.
CPC .............. *H04L 1/1671* (2013.01); *H04L 1/08* (2013.01); *H04L 41/5009* (2013.01); *H04L 43/0829* (2013.01)

(58) Field of Classification Search
CPC . H04L 1/08; H04L 1/1671; H04L 2001/0093; H04L 41/40; H04L 41/5009; H04L 43/0829; H04W 24/04
See application file for complete search history.

(56) References Cited

U.S. PATENT DOCUMENTS 9,876,612 B1 * 1/2018 Maveli .................... H04L 47/34
2004/0117498 A1    6/2004 Hashimoto et al.
(Continued)

FOREIGN PATENT DOCUMENTS

EP    2 314 005 B1    11/2017

OTHER PUBLICATIONS

PCT International Search Report issued for International application No. PCT/SE2020/050157—Apr. 15, 2020.
(Continued)

*Primary Examiner* — Albert Decady
*Assistant Examiner* — Enamul M Kabir
(74) *Attorney, Agent, or Firm* — Sage Patent Group

(57) ABSTRACT

A method performed by a base station includes determining a reliability requirement for a packet to be transmitted to a wireless device. The reliability requirement is determined based at least in part on a consecutive packet loss associated with at least one previously transmitted packet. Based on the reliability requirement, the packet is transmitted to the wireless device.

20 Claims, 21 Drawing Sheets

(51) Int. Cl.
    *H04L 41/5009*    (2022.01)
    *H04L 43/0829*    (2022.01)

(56) References Cited

U.S. PATENT DOCUMENTS

| | | | |
|---|---|---|---|
| 2008/0052394 A1* | 2/2008 | Bugenhagen | H04L 45/28 |
| | | | 709/224 |
| 2008/0080369 A1* | 4/2008 | Sumioka | H04L 1/1887 |
| | | | 370/473 |
| 2012/0011413 A1* | 1/2012 | Liu | H03M 13/25 |
| | | | 714/746 |
| 2015/0003242 A1 | 1/2015 | Han et al. | |
| 2017/0164259 A1 | 6/2017 | Chiu et al. | |
| 2019/0280834 A1* | 9/2019 | Joseph | H04L 47/29 |
| 2020/0044787 A1* | 2/2020 | Wang | H04L 1/1887 |
| 2020/0275509 A1* | 8/2020 | Yu | H04W 76/27 |
| 2021/0377793 A1* | 12/2021 | Moilanen | H04L 1/08 |

OTHER PUBLICATIONS

3GPP TS 22.104 v16.0.0; Technical Specification; 3rd Generation Partnership Project; Technical Specification Group Services and System Aspects; Service requirements for cyber-physical control applications in vertical domains; Stage 1 (Release 16)—Dec. 2018.
PCT Written Opinion of the International Searching Authority issued for International application No. PCT/SE2020/050157—Apr. 15, 2020.
First Office Action dated Feb. 27, 2024 for Chinese Patent Application No. 202080014626.1, 7 pages (includes English translation).

\* cited by examiner

SYSTEMS AND METHODS TO REDUCE CONSECUTIVE PACKET LOSS FOR DELAY CRITICAL TRAFFIC

PRIORITY

This nonprovisional application is a U.S. National Stage Filing under 35 U.S.C. § 371 of International Patent Application Serial No. PCT/SE2020/050157 filed Feb. 13, 2020 and entitled "SYSTEMS AND METHODS TO REDUCE CONSECUTIVE PACKET LOSS FOR DELAY CRITICAL TRAFFIC" which claims priority to U.S. Provisional Patent Application No. 62/804,896 filed Feb. 13, 2019 and U.S. Provisional Patent Application No. 62/805,477 filed Feb. 14, 2019, all of which are hereby incorporated by reference in their entirety.

TECHNICAL FIELD

The present disclosure relates, in general, to wireless communications and, more particularly, systems and methods to reduce consecutive packet loss for delay critical traffic.

BACKGROUND

The current disclosure is related to providing new functionality in existing Radio Access Networks (RANs) such as, for example, 2G, 3G, and 4G, and future RANs such as, for example, 5G, 6G, and so on. The area of functionality is about providing new radio interface scheduling functionality, both downlink (DL) and uplink (UL), in connectivity for industrial applications.

Evolved Packet System (EPS) is the Evolved 3rd Generation Partnership Project (3GPP) Packet Switched Domain and consists of Evolved Packet Core (EPC) and Evolved Universal Terrestrial Radio Access Network (E-UTRAN).

FIG. 1 illustrates an overview of a non-roaming EPC architecture for 3GPP accesses. This architecture is defined in 3GPP TS 23.401, which also provides definitions of the Packet Data Network Gateway (PDN Gateway), Serving Gateway (SGW), Policy and Charging Rules Function (PCRF), Mobility Management Entity (MME) and mobile device such as, for example, a user equipment (UE), and the architecture is incorporated herein in its entirety by reference. The Long-Term Evolution (LTE) radio access, E-UTRAN, consists of one more eNodeBs (eNBs).

FIG. 2 illustrates the overall E-UTRAN architecture. The E-UTRAN is further defined in, for example, 3GPP TS 36.300 and consists of eNBs, providing the Evolved-Universal Terrestrial Radio Access (E-UTRA) user plane, including the Packet Data Convergence Protocol (PDCP) Radio Link Control (RLC), and Medium Access Channel (MAC), and Physical layer (PHY), and the control plane protocol terminations via Radio Resource Control (RRC) towards the UE. The main functionality in the current invention is the MAC scheduler in the MAC protocol layer.

Standardization work is ongoing on Next Generation-RAN (NG-RAN) and 5G Core (5GC) as radio access and packet core network evolves. 3GPP TS 23.501 and 3GPP TS 23.502 include stage-2 descriptions, for example.

FIG. 3 illustrates the 5G System architecture using service-based representation as disclosed in TS 23.501 V15.0.0. The (R)AN, UE and the air interface between these is relevant to this disclosure.

FIG. 4 illustrates the internal architecture for a gNodeB (gNB) such as the base station supporting New Radio (NR) Radio Access Technology (RAT) in the (R)AN depicted in FIG. 3. The gNB may be called a NG-RAN 0.3GPP TS 38.401 includes a stage-2 description of NG-RAN.

FIG. 4 assumes that both Higher Layer Split (HLS) and Control Plane and User Plane split (CP-UP split) have been adopted within the gNB. The MAC scheduler in the MAC protocol layer in the DU(s) is especially relevant to this disclosure.

Quality of Service (QoS) principles have been developing in the different mobile network generations in 3GPP. The main principles related to QoS in EPS and 5G System (5GS) are discussed below.

QoS is managed in EPS on a per bearer level from the Core Network (CN). The eNB is responsible for setting up the radio bearers, radio resource management, and enforcing QoS according to the bearer QoS Profile—over the radio interface, which may include the LTE-Uu, for example, in the downlink and over the transport network in the uplink. FIG. 5 illustrates an overview of the QoS framework in EPS. Bearers including a QoS Profile are set up from the PDN GW in the CN, and QoS is enforced in the PDN GW and in the eNB for the downlink, and in the UE and the eNB for the uplink.

Many services and subscribers share the same radio and network resources. Real-time services such as voice and video, for example, are sharing the same resources as non-real-time services such as Internet browsing and file download, for example. One challenge in this area is how to ensure bit rates, packet delays, packet loss, and other QoS requirements for Real Time Services. 3GPP EPS (i.e. both E-UTRAN and EPC) provides efficient QoS mechanisms to ensure that the user experience of different services sharing the same resources is acceptable. Examples of such mechanisms provided in 3GPP are:

- Traffic Separation: Different traffic types receive different treatment (queuing, etc.) in network
- 3GPP provides for both relative QoS and absolute QoS (using Guaranteed Bit Rates)
- GBR (Guaranteed Bit Rate) based admission control is used to reserve resources before traffic is admitted into the network or rejected otherwise
- Policy (PCC) may determine what treatment to apply to the traffic streams 3GPP defines the concept of a PDN. A PDN is in most cases an Internet Protocol (IP) network such as, for example, the Internet or an operator IP Multi-Media Subsystem (IMS) service network. A PDN has one or more names, and each name is defined in a string called Access Point Name (APN). The Packet Gateway (PGW) is a gateway towards one or more PDNs. A UE may have one or more PDN connections. A PDN connection is a logical IP tunnel between UE and PGW, providing the UE access to a PDN. The setup of a PDN connection is initiated from the UE.

Every PDN connection consists of one or more bearers. 3GPP TS 23.401 section 4.7.2 includes a description of the bearer concept. A bearer uniquely identifies traffic flows that receive a common QoS treatment between a UE and a PGW. Each bearer on a particular access has a unique bearer ID. On the 3GPP access, the bearer is end-to-end between UE and PGW. Every PDN connection has at least one bearer and this bearer is called the default bearer. All additional bearers on the PDN connection are called dedicated bearers.

A bearer carries traffic in the form of IP packets or non-IP packets. Which traffic is carried on a bearer is defined by filters. A filter is an n-tuple where each element in the tuple contains a value, a range, or a wildcard. An n-tuple is also known as an IP flow. An example of a 5-tuple is (dst IP=83.50.20.110, src IP=145.45.68.201, dst port=80, src port=*, prot=TCP). This 5-tuple defines a source and destination IP address, a source and destination port, and a protocol. The source port is a wildcard. Traffic matching this 5-tuple filter would be all TCP traffic from IP=145.45.68.201 to IP=83.50.20.110 and port=80. A traffic flow template (TFT) contains one or more filters. Every bearer has a TFT. One bearer within a PDN connection and access may lack an explicit TFT. This bearer is typically the default bearer. Implicitly, such a bearer has a TFT with a single filter matching all packets.

There are two types of bearers: GBR and non-GBR bearers. Every EPS bearer is associated with the following QoS parameters: QoS Class Identifier (QCI) and Allocation and Retention Priority (ARP). GBR bearers are in addition associated with bit rate parameters for Guaranteed Bit Rate (GBR) and Maximum Bit Rate (MBR). Non-GBR bearers do not have bearer-level bit rate parameters. Instead there is aggregate enforcement of all non-GBR bearers using Aggregate Maximum Bit Rates (AMBR). Access Point Name-Aggregate Maximum Bit Rates (APN-AMBR) are defined per subscriber and APN, and User Equipment-Aggregate Maximum Bit Rates (UE-AMBR) are defined per subscriber.

The Quality Control Information (QCI) is signalled from the CN to the eNB and defines specific characteristics to be applied for all traffic on this bearer. These characteristics may include: resource type (GBR or Non-GBR), priority, Packet Delay Budget (PDB), Packet Error Loss Rate, Maximum Burst Size (for some GBR QCIs) and Data rate Averaging Window (for some GBR QCIs).

QoS is managed in 5GS on a per QoS Flow level from the CN. The NG-RAN such as, for example, a gNB or ng-eNB, is responsible for setting up the radio bearers for QoS Flows, radio resource management, and enforcing QoS according to the QoS Flow Profile—over the radio interface in the downlink and over the transport network in the uplink. FIG. 6 illustrates an overview of the QoS framework in 5GS. QoS Flows including a QoS Profile are set up between the User Plane Function (UPF) in the 5GC and the UE.

5GS has defined a new term called a Protocol Data Unit (PDU) session that is very similar to a PDN connection described above. One difference is that there is normally only a single N3/NG-U tunnel (a GTP-U tunnel) for each PDU session between the UPF and NG-RAN. This means that the mapping of different traffic/QoS flows to radio bearers is performed in the NG-RAN. For example, a radio bearer can carry one or more QoS Flows. A QoS Flow is the finest granularity of QoS differentiation in a PDU session. Each QoS Flow is associated with QoS parameters that are used to enforce the correct traffic forwarding treatment. Each packet belongs to a QoS Flow and one PDU session can carry one or several QoS Flows.

The QoS Flow level QoS Parameters can be either non-dynamic or dynamic. The Non-dynamic case is very similar to the QCI concept in EPS but is called as 5G QoS Identifier (5QI). This means that the 5QI is signaled from 5GC to NG-RAN and defines the main characteristics for the QoS Flow. The dynamic case is somewhat different as in this case additional characteristics are also signaled from 5GC to NG-RAN. These signaled characteristics may include Priority Level, Packet Delay Budget, Packet Error Rate, Delay Critical, Averaging Window, and Maximum Data Burst Volume.

Advanced connectivity solutions are key to support the evolution of industries and their mission critical industrial activities as well as less critical communication needs. Some of the emerging technology tools and their applications are digital twins, smart workspaces, smart robots, and virtual assistants. Examples of implementation technologies are virtual and augmented reality, data augmentation, additive manufacturing, and IoT platforms.

The main drivers for wireless connectivity are:
Replacing (or avoiding) cables, which are costly to deploy and maintain/troubleshoot.
Connecting machines or parts of equipment that are impossible or impractical to connect by wire (e.g., fast-moving parts).
Preventive maintenance and big-data analytics, by connecting large numbers of sensors.
Furthering the industry expectation implementing 5G technologies within Operational Technologies is economy of scale.

Connectivity requirements for manufacturing use cases are very diverse. A majority of the identified industry automation use cases are today connected through fixed industrial networks. Typical use cases in this area are motion control, robot control, production line and process control. The current wireless connected use cases are today typically of less critical nature as monitoring and parametrization. In automotive factories, the traffic consists mainly of real-time traffic, which is carried by protocols with highly-integrated protocol stack such as, for example, Profinet Real-Time stack. The TCP/IP protocol stack is mainly used for carrying messages pertaining to startup configuration, notifications and non-critical alarm messages; with preventive monitoring, this type of traffic will increase. Hence connectivity requirements are very use case and application specific.

Latency is expected to be the dominating deciding factor on whether a use case can be deployed using LTE or whether NR is required. Latency with a guaranteed upper bound is also very essential for critical automation use cases; packets need to arrive on time, otherwise they are considered lost.

Mobile Broadband is the use case that mobile operators today earn money on and consequently the use case they optimize their networks for and the use case which their vendors optimize their products for.

Mobile broadband traffic is dominated by video and web traffic. Excellent network performance is a very important factor for customer satisfaction, but there are no strict quality of service requirements; applications (and consumers) are adaptive and can typically tolerate variations in network performance.

Most of the traffic is carried via transport protocols such as TCP with reliable message transfer. This means that packet loss typically is visible to applications only as a degradation of network throughput. Applications typically adapt dynamically to such throughput variations. Thus, there are no strict requirements on packet loss, but rather soft requirements to provide good end-user experience. Similarly, there are no strict network latency requirements. Though there is a relationship between latency and TCP throughput, jitter is usually tolerated. However, packet loss has a bigger negative impact on TCP throughput than jitter. As such, 3GPP systems use network-internal retransmissions such as, for example, Hybrid Automatic Repeat Request (HARQ) retransmissions to deliver packets without any upper bound on latency.

As opposed to MBB applications, many industrial applications are non-adaptive control systems with strict network performance requirements.

Some industrial applications will consider the communication system to be unavailable if it does not fulfill the quality of service required by the application. QoS in this context usually means ability to successfully deliver a packet within a specified upper-bound packet delay budget, and requirements are usually expressed as a target reliability calculated as a percentage value of the amount of sent packets successfully delivered within the packet delay budget required by the targeted application, divided by the total number of sent packets.

How tolerant the application is to unsuccessful packet deliver is partly governed by how many consecutive lost application packets the application can accept before taking emergency actions such as, for example, emergency shutdown and production stop. The time during which the application can manage some packet loss without taking emergency actions is referred to as survival time. The survival time depends on the application implementation and differs a lot between different industries and use cases, from 10 s of seconds down to 10 ms, 1 ms or even 0 ms. 3GPP TR 22.104, table 5.2.1 discloses some examples.

For an application with a survival time equal to 0 ms, the reliability requirement (e.g. $10^{-6}$) is the probability of not delivering the packet in time. Retransmissions within the network such as HARQ retransmissions can be ok, as long as the complete packet can be delivered within the packet delay budget. If the system is unable to deliver the packet in time, the application considers the packet lost and without any survival time the system is immediately considered unavailable.

For an application with a survival time greater than 0 ms, there are not one but two reliability requirements to consider:
1. The probability for each individual packet being unsuccessful (denoted $P_1$)
2. The probability of more than X consecutive packets being unsuccessful (denoted $P_X$), where X largely depends on the survival time.

If the probability of more than X consecutive packets being unsuccessful is, for example, $10^{-6}$, the probability for each individual packet being unsuccessful can be higher than that. If the two error events are independent, $P_X=(P_1)^X$.

An application may, for example, accept that one packet is not delivered successfully within the packet delay budget, but if two consecutive packets are not delivered successfully, the application will take emergency action.

FIG. 7 illustrates examples of how two different applications experience the same sequence of events, where the application sends application packets A-G, but where the communication system is not able to deliver packets B, C, E, F and G successfully in due time. In the illustrated example, one application has a survival time equal to 0 ms and another application with survival time greater than 0 ms The application with a survival time equal to 0 ms considers the system unavailable as soon as packet B is not delivered successfully. The application with a survival time greater than 0 ms can in this example tolerate two consecutive unsuccessful packets but if three consecutive packets are unsuccessful, it considers the communication system unavailable. It will, thus, consider the system still available when Packet B as well as when Packet C are not delivered successfully and then Packet D is successful, so the device will not consider the communication service to be down even if Packet B and C were lost.

But when three consecutive packets such as Packets E, F and G, are unsuccessfully delivered to the device, the industrial application in the device will consider the communication service to be unavailable. This may lead to the industrial application initiating emergency shutdown of the production cell or production line, for example, to avoid damage to machinery, products or humans.

The RAN Scheduler feature distributes radio interface and Radio Base Station (RBS) resources between various user and control data flows requesting transmission in the cell. It gives priority to robust system control signaling and retransmissions over user data. It enables users to be multiplexed and scheduled in time and frequency, efficiently using spectral and hardware resources to optimize user throughput and cell capacity.

Scheduling, also referred to as Dynamic Resource Allocation, is done dynamically for every Transmission Time Interval (TTI) of 1 ms in a standard LTE system. For every upcoming TTI, the Scheduler determines the users that are assigned radio interface and RBS resources.

For a more evolved LTE system or a system involving NR technology, the TTIs in question may be of varying size and shorter than 1 ms.

The scheduler takes into account inputs like, Channel Quality Information (CQI) reported by the UEs, Acknowledgements (ACK)/Non- or Negative-Acknowledgments (NACKs), amount of data each UE wants to transfer, available UL/DL bandwidth, bearer priority/QCI, etc, when determining for the upcoming TTI which UEs to schedule, the amount of resources to allocate per UE and what Transport Block Size (TBS) and transport format to use per UE.

The main responsibility of the scheduler is to maximize the number of users that fulfill the QoS requirements and to maximize spectrum/resource efficiency. A set of scheduling algorithms are used to achieve that:

Round-Robin scheduling algorithm: This scheduler algorithm distributes the same number of resource blocks to all users. It is simple but it can lead to very unfair resource allocation, where users at the cell edge get the same number of resources than central users, resulting in massive difference in terms of throughput.

Proportional fair scheduling algorithm: This scheduler addresses the main weakness of the Round-Robin scheduler, i.e., the fairness. This scheduler allocates resources to users according to priority mechanism. The priority of a user is inversely proportional to the amount of data the user could transmit in previous communication phases. That way the scheduler algorithm makes sure that all users are treated fairly in terms of throughput and not allocated resources.

Delay based scheduler: This scheduling algorithm is mainly designed for VoIP or Conversational Video services. Such services have a characteristic that the QoS will be degraded dramatically when the packet exceeds its packet delay budget (PDB), but no improvement from an even faster arrival time than PDB. The delay-based scheduler utilizes the characteristics to enhance the spectrum efficiency in a mixed scenario with both best effort and Voice over IP (VoIP) services. The scheduler allocates the resources to the best effort services before the VoIP users reaches it PDB and allocates the resources to the VoIP users when their PDB is in danger of being violated. With this way the scheduler is able maximize the throughput for the best effort service while securing the PDB for the VoIP services at the same time.

Certain problems exist. For example, the link adaptation mechanism is designed to target a certain reliability for an individual transmission. Hence, the success or unsuccessfulness of previously transmitted packets/messages belonging to the same data flow and UE are not considered when the link adaptation is making decisions about upcoming new transmissions. This means that a certain reliability can only be targeted/considered for individual packets. Then for the next packet, the same reliability is targeted. Many industrial applications have a built in survival time which means that they can afford to lose one packet every now and then, but not more than n consecutive packets (n>0).

Existing products and algorithms are not designed to leverage this knowledge to consider aggregated reliability and robustness across multiple transmissions belonging to the same data flow.

SUMMARY

Certain aspects of the present disclosure and their embodiments may provide solutions to these or other challenges. For example, according to certain embodiments, improvements to the radio resource management mechanisms are provided that are suitable for cellular systems handling delay critical traffic. Certain embodiments may, for example, be implemented in a cellular system implementing Long-Term Evolution (LTE) and/or New Radio (NR) radio technologies.

According to certain embodiments, a method performed by a base station includes determining a reliability requirement for a packet to be transmitted to a wireless device. The reliability requirement is determined based at least in part on a consecutive packet loss associated with at least one previously transmitted packet. Based on the reliability requirement, the packet is transmitted to the wireless device.

According to certain embodiments, a base station includes processing circuitry configured to determine a reliability requirement for a packet to be transmitted to a wireless device. The reliability requirement is determined based at least in part on a consecutive packet loss associated with at least one previously transmitted packet. Based on the reliability requirement, the processing circuitry is configured to transmit the packet to the wireless device.

According to certain embodiments, a method performed by a base station includes determining a reliability requirement for a packet to be transmitted from a wireless device. The reliability requirement is determined based at least in part on a consecutive packet loss associated with at least one previously transmitted packet. The base station instructs the wireless device to transmit the packet according to the reliability requirement.

According to certain embodiments, a base station includes processing circuitry configured to determine a reliability requirement for a packet to be transmitted from a wireless device. The reliability requirement is determined based at least in part on a consecutive packet loss associated with at least one previously transmitted packet. The processing circuitry is configured to instruct the wireless device to transmit the packet according to the reliability requirement.

Certain embodiments may provide one or more of the following technical advantages. For example, one technical advantage may be that certain embodiments may be implemented as part of the link adaptation function in the eNodeB (eNB)/GNodeB (gNB) scheduler. As a result, the scheduler will be able to adjust the robustness of individual transmissions/packets belonging to the same data flow with the goal to successfully deliver at least one successful transmission/packet during a given time (the transfer interval+the survival time). Another technical advantage may be that, instead of only being able to target a certain Block Error Rate (BLER) for each individual packet, certain embodiments enable the BLER target of a consecutive packet to be adjusted by using knowledge about how many consecutive packets can be afforded to be lost and what the current consecutive packet success rate of the specific data flow is.

As another technical advantage, for applications with very strict requirements, certain embodiments may be used to provide even further robustness to consecutive transmissions in case an individual transmission is lost.

Yet another technical advantage may be that certain embodiments may be used to relax the robustness of transmissions as long as packets are successfully delivered to increase the system capacity. Then once a packet is lost, the robustness of consecutive packets can be increased to avoid consecutive packet loss and devices considering the communication service to be unavailable.

With a system not implementing this feature, the application level reliability (probability of more than X consecutive packets being unsuccessful (denoted $P_X$)) depends on the probability of each individual packet being unsuccessful (denoted $P_1$). For independent error events, $P_X=(P_1)^X$ but often error events are not independent meaning that Px is higher than $(P_1)^X$. However, a technical advantage may be that certain embodiments may be used to provide a better application level reliability (lower Px) using the same P1 or the same application level reliability using a higher P1 compared to a system not implementing the disclosed feature(s). Using a higher P1 means that less resources such as, for example, time resources, frequency resources, and/or power resources, have to be used to serve the user equipment (UE), thus increasing the system capacity. For example, a less conservative link adaptation can be used in general and only when packet loss is detected a more conservative link adaptation is used.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
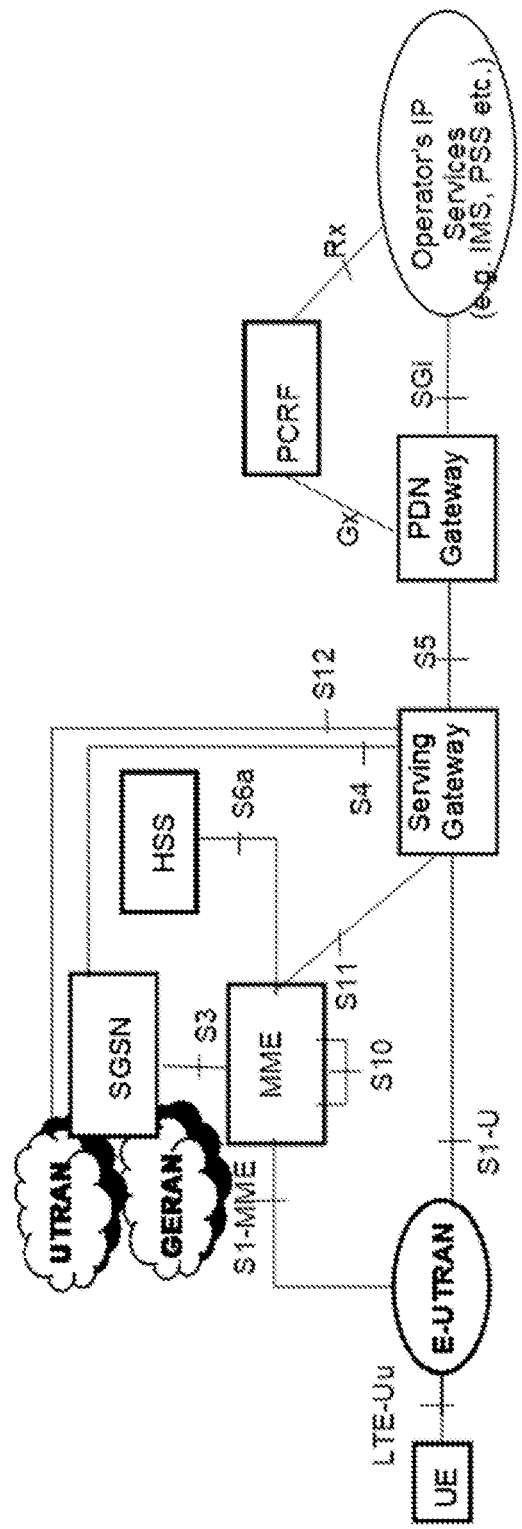
FIG. 1 illustrates an overview of a non-roaming Evolved Packet Core (EPC) architecture for 3GPP accesses.
Figure 2:
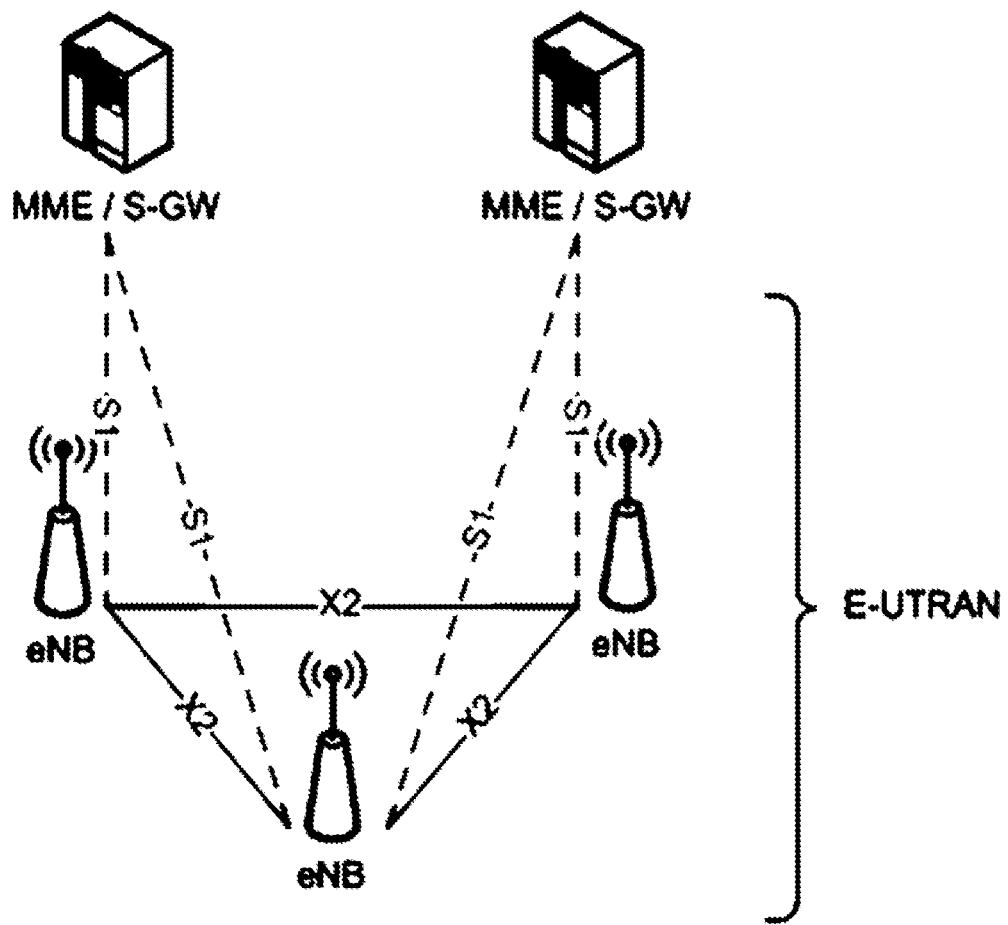
FIG. 2 illustrates the overall Evolved Universal Terrestrial Radio Access Network (E-UTRAN) architecture.
Figure 3:
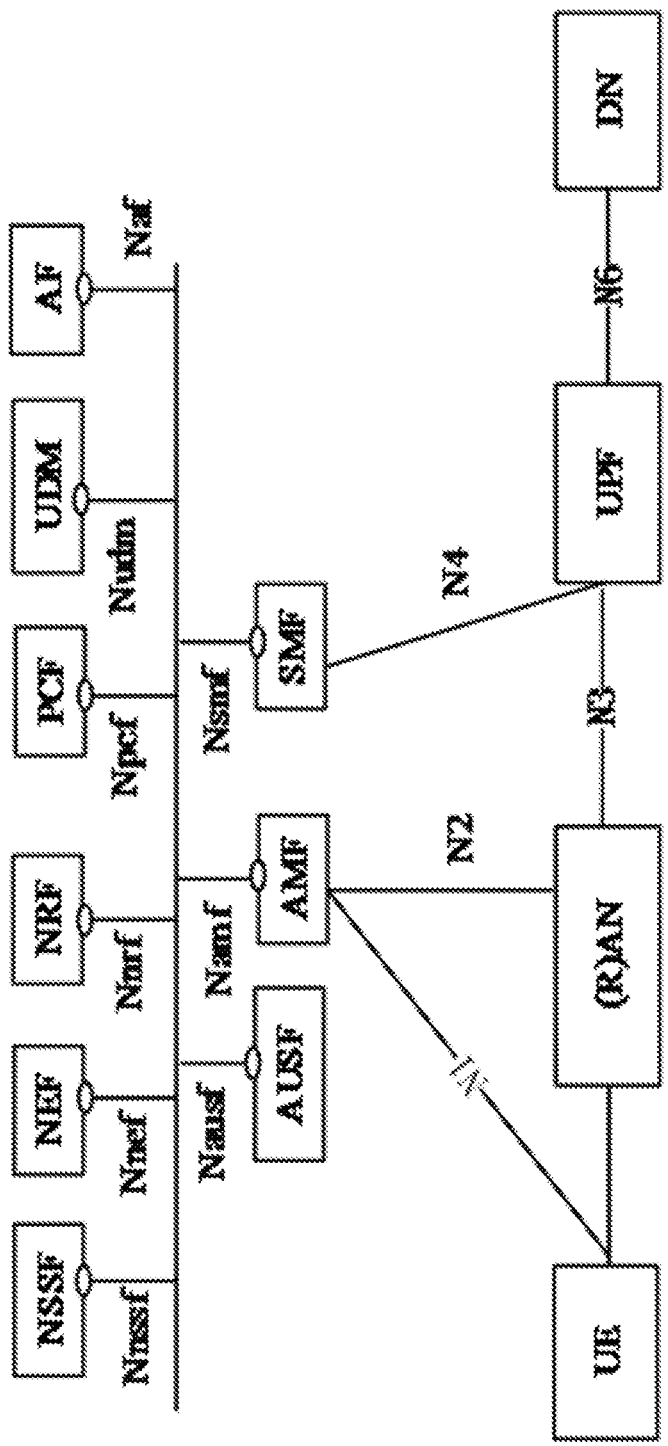
FIG. 3 illustrates the 5G System architecture using service-based representation as disclosed in TS 23.501 V15.0.0.
Figure 4:
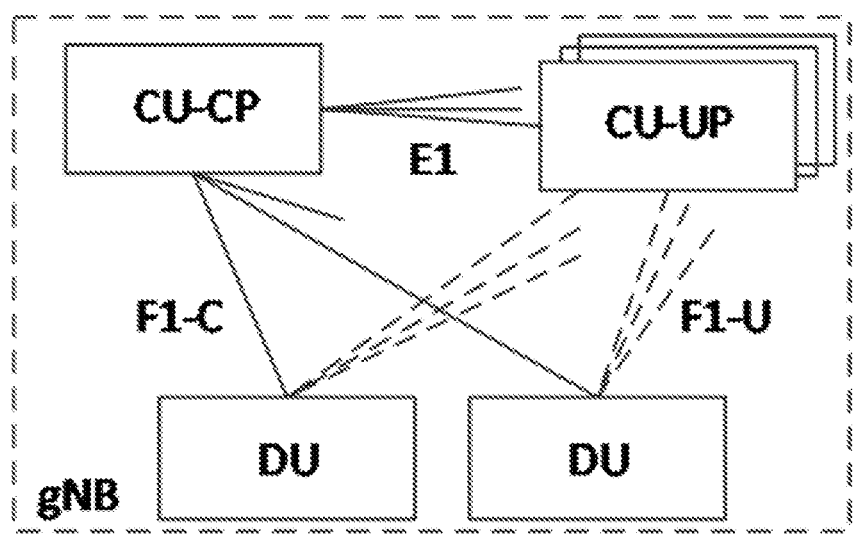
FIG. 4 illustrates the internal architecture for a gNodeB (gNB) such as the base station supporting New Radio (NR) RAT.
Figure 5:
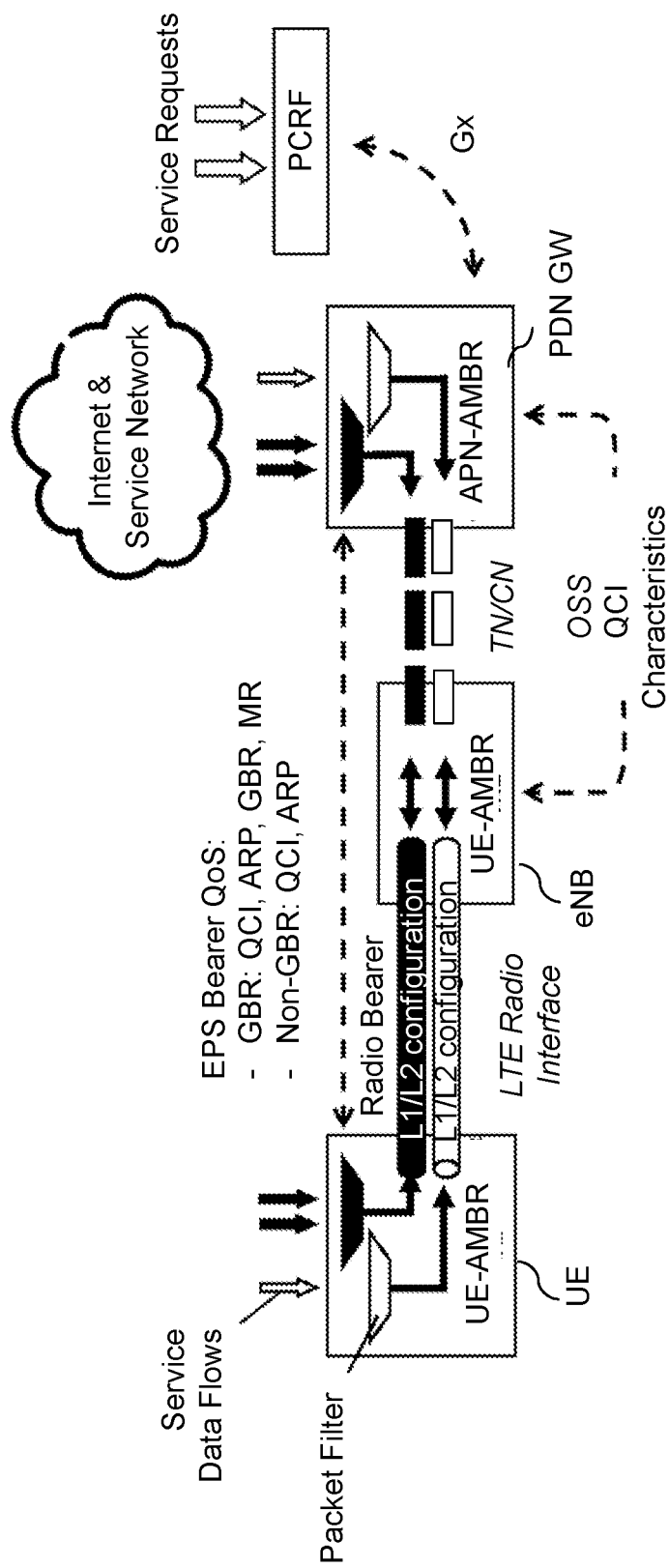
FIG. 5 illustrates an overview of the Quality of Service (QoS) framework in Evolved Packet System (EPS)

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. Mobile Switching Center (MSC), MME, etc.), Operation & Management (O&M), Operations Support System (OSS), Self-Optimized Network (SON), positioning node (e.g. Evolved Serving Mobile Location Center (E-SMLC)), Minimization Drive Test (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

According to certain embodiments, the behavior of a scheduler is adjusted to become aware of consecutive packet loss towards a specific UE and/or bearer/data flow. Additionally or alternatively, certain embodiments apply methods to reduce the risk of consecutive packet loss (which industrial applications are sensitive to) beyond what is supported with existing link adaptation mechanisms. Industrial applications are particularly sensitive to consecutive packet loss. This means that industrial applications may perceive a higher reliability in terms of packet delivery as compared to a system which does not apply methods to reduce consecutive packet loss.

According to certain embodiments, some assumptions may be applicable:

Radio Access Network (RAN) is for a specific data flow aware of the packet delay budget and the required reliability in terms of maximum number of consecutive packets that may be lost by means of, for example, but not limited to, standards, configuration (e.g. as part of Quality Control Information (QCI)/5G QoS Identifier (5GQI) profile, signaled as a specific Information Element (IE) from the Core Network (CN) to RAN), machine learning, etc.

The techniques described herein apply to both application messages segmented or not segmented within the RAN (e.g. by gNB or eNB).

Re-transmissions when stated below would refer to re-transmissions performed by RAN such as, for example, Packet Data Convergence Protocol (PDCP), Hybrid Automatic Repeat Request (HARQ) or Radio Link Control (RLC) re-transmissions The survival time window mentioned below corresponds to the sum of the transfer time or packet delay budget of a single application packet plus the survival time of the application. Within the survival time window at least one application packet has to be successfully delivered for the application to not consider the communication service to be down.

In one example, the survival time of the industrial application is provided to the eNB/gNB as part of the QCI profile configuration associated with the bearer that is setup to carry the associated application traffic.

Certain embodiments described herein recognize that:

Individual packets but not consecutive packets may be lost.

In case of packet loss, RAN can adapt transmission of consecutive packets to reduce the probability of consecutive packet loss.

RAN has information about reliability requirement for consecutive packets and/or for the survival time window and adapts individual transmissions accordingly ($P_1, P_2, \ldots, P_x$).

Whereas current scheduling solutions consider only one packet at the time and not the reliability achieved over time for a number of related/dependent packets, the techniques disclosed herein include the introduction of P2, .... Px and consider the aggregated reliability over time for consecutive packets which have some dependency. A benefit with this approach is that, to achieve a certain Px, P1 can be lowered as compared to a system that has not implemented Px but tries to achieve the same Px using only P1.

The survival time window reflecting the survival time of the industrial application and, thus, the number of consecutive packets that may be lost may, in a particular embodiment, be configured in the eNB as part of the QCI profile, or signaled as part of quality of service parameters.

According to certain embodiments, a method for reduced consecutive packet loss may include:

Step 1a: For a specific data flow associated with a specific UE, the eNB/gNB may be configured or otherwise be aware of the packet delay budget, how many consecutive packets the application utilizing the data flow can afford to lose, and the reliability requirements both for single packet delivery ($P_1$) and consecutive packet delivery ($P_x$) as well as other QoS related criteria.

Step 1b: Additionally or alternatively to step 1a, the eNB/gNB may be configured with or aware of a "survival time window" during which a certain reliability has to be fulfilled. Successful packet delivery is assumed to reset the survival time window. The eNB/gNB may use the awareness of this survival time window to estimate how many consecutive packets it may afford to lose while still fulfilling the reliability requirement for said data flow during this survival time window.

Step 2: When a transmission is unsuccessful the eNB/gNB will, based on packet delay budget and/or known survival time window and or application survival time, determine if PDCP, HARQ and/or RLC re-transmissions can be afforded without the packet arriving too late at the application and being considered lost. If all attempted re-transmissions are unsuccessful or do not complete in time (late packet=lost packet), the eNB will consider the packet to be unsuccessfully delivered.

Depending on how many consecutive packets can be afforded to be lost and the targeted reliability requirement for consecutive packets $P_x$, the eNB/gNB may consider increasing the reliability (see some example methods below) already for the first re-transmission or for one of the additional re-transmission. For example, if there is no survival time for a certain application, the survival time window will be equal to the packet delay budget of a single transmission and then the eNB must ensure successful delivery either on the first shot or with the number of re-transmissions that can be afforded within the packet delay budget.

Step 3: For the next transmission eNB/gNB for said UE and data flow (i.e. new data/message/packet), the eNB/gNB will consider the information about the target reliability of the survival time window and/or $P_x$, and the estimated number of remaining transmissions within the survival time window and/or before exceeding maximum number of consecutive packets it may lose to determine the target reliability for the next transmission. Based on this information, the eNB/gNB may target a higher reliability for the next transmission in order to reach the target reliability of the survival time window and/or of $P_x$. For example, the eNB/gNB may adjust the Modulation Coding Scheme (MCS) to be used for this transmission, or use packet repetition (as defined in 3GPP Rel-15).

Step 4: If the next transmission is also unsuccessful, eNB/gNB both determines how many re-transmissions can be afforded and also considers whether the eNB/gNB needs to increase the reliability such as by selecting a different MCS, for example, of each re-transmission, depending on whether further consecutive packet may be lost or not. If further consecutive packets may not be lost, this increases the demand on the eNB/gNB to ensure successful delivery of this packet within the packet delay budget in order to fulfill the reliability for the survival time window and/or $P_x$.

Methods to increase the reliability of a (re-)transmission include, but are not limited to:

Using a more robust MCS

Increasing the UE/eNB transmit power

Using packet repetition

Blanking of interfering transmission points

Joint transmission from multiple transmission points

Utilizing antenna diversity (e.g. use transmit diversity instead of Multiple Input-Multiple Output (MIMO))

Step 5: The eNB/gNB considers the next transmission successful. It determines that the number of consecutively lost packets is currently zero for said UE and data flow, and the eNB/gNB may, thus, adjust the MCS to some initial level for the given type of data flow. According to certain embodiments, additional considerations that may also be taken into account include:

In a particular embodiment, if there are more unsuccessful consecutive transmissions than a certain threshold associated with a given data flow, the eNB/gNB may trigger an alarm or notification and indicate affected data flow(s) and/or associated UEs. This threshold could, for example, be configured to trigger an alarm when QCI is no longer fulfilled or while QCI is still fulfilled but a certain number of consecutive transmissions have been lost, thus getting close to the limit of the survival time. Observing the number of consecutive packets lost is also useful for statistics.

In a particular embodiment where the eNB/gNB is serving multiple UEs with the same radio resources and when the UEs have same priority data flows, the eNB/gNB may consider, for each UE, how many consecutive packets have been lost. This information may further be considered by eNB/gNB when deciding the scheduling weight to be associated with each UE (and data flow) for the next scheduling opportunity. UEs for which at least one consecutive packet was unsuccessfully received will be given a higher weight compared to UEs with equal priority (e.g. as part of QoS Profile) who did not lose any packets.

In a particular embodiment, if packet duplication across multiple data paths is used, the eNB/gNB may compensate one path being down by increasing the reliability of the transmission on the remaining path(s) for affected UE(s). This can be applied either for a single UE using dual connectivity or carrier aggregation type of packet duplication as well as for a device equipped with two or more active UEs (or should it say radio chains or something like that to also include dual sim dual active) where the eNB/gNB is aware of the status of all connections. The survival time window reflecting the survival time of the industrial application and, thus, the number of consecutive packets that may be lost, may be configured in the eNB as part of the QCI profile, or signaled as part of quality of service parameters.

In a particular embodiment, for UL transmissions, when the eNB/gNB detects that the number of re-transmissions that can be executed within the packet delay budget have been performed without the packet being successfully delivered, it may anyway send an ACK for the HARQ process in question together with a toggled NDI on DCI to make the UE flush the HARQ buffer. The UE can be configured according to standards to skip the UL transmission instead of sending padding.

In a particular embodiment, for UEs and/or data flows where the eNB/gNB detects that the DL or UL transmissions are unsuccessful and the survival time of the application has been exceeded, the eNB/gNB may consider changing the priority of the associated transmission in the other direction (UL or DL) and give higher priority to other data flows, for same or different UEs, which are still successful and/or within their survival time. In one alternative the eNB/gNB may even stop granting the UE which has exceeded its survival time unless it receives a BSR indicating new data or detects new data in the DL buffer.

In a particular embodiment, for UEs and/or data flows where the eNB/gNB detects that a DL or UL transmissions is unsuccessful, the eNB/gNB may consider improving the reliability of the associated transmission in the other direction (UL or DL).

Figure 8:
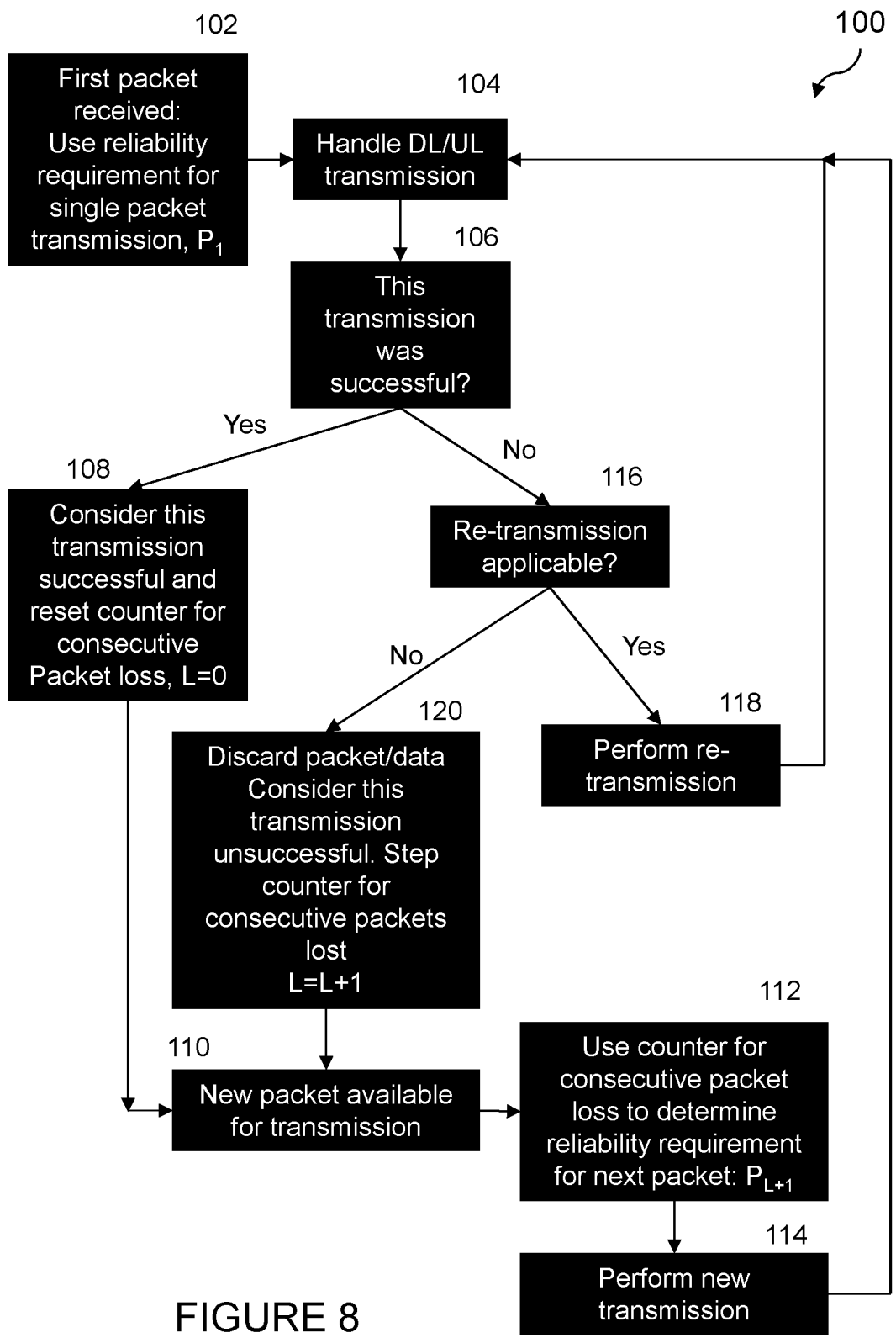
FIG. 8 illustrates an example implementation considering consecutive packet loss as input to link adaptation for new transmissions of the same data flow, according to certain embodiments.

FIG. 8 illustrates an example implementation considering consecutive packet loss as input to link adaptation for new transmissions of the same data flow, according to certain embodiments. At step 102, the first packet is received. A reliability requirement is used for single packet transmission, $P_1$. At step 104, DL/UL transmission is handled.

At step 106, it is determined whether the transmission was successful. If the transmission was successful a rest counter for consecutive packet loss (L) is set to 0, at step 108. At step 110, a new packet is available for transmission. At step 112, the counter is used for consecutive packet loss to determine the reliability requirement for the next packet, $P_L+1$. The transmission of the new packet is performed at step 114, and the method returns to step 104, where the DL/UL transmission is handled Returning to step 106, if it is determined that the transmission of the first packet was unsuccessful, the method proceeds to step 116, where it is determined whether a re-transmission of the first packet is applicable. If re-transmission is applicable, the re-transmission is performed at step 118. Conversely, if re-transmission is not applicable, the packet/data is discarded and the transmission is considered unsuccessful, and the counter for consecutive packets lost is incremented such that L equals L+1, at step 120. The method then returns to step 110, where it is again determined that a new packet is available for transmission. At step 112, the counter is used for consecutive packet loss to determine the reliability requirement for the next packet, $P_L+1$. The transmission of the new packet is performed at step 114, and the method returns to step 104, where the DL/UL transmission is handled.

Figure 9:
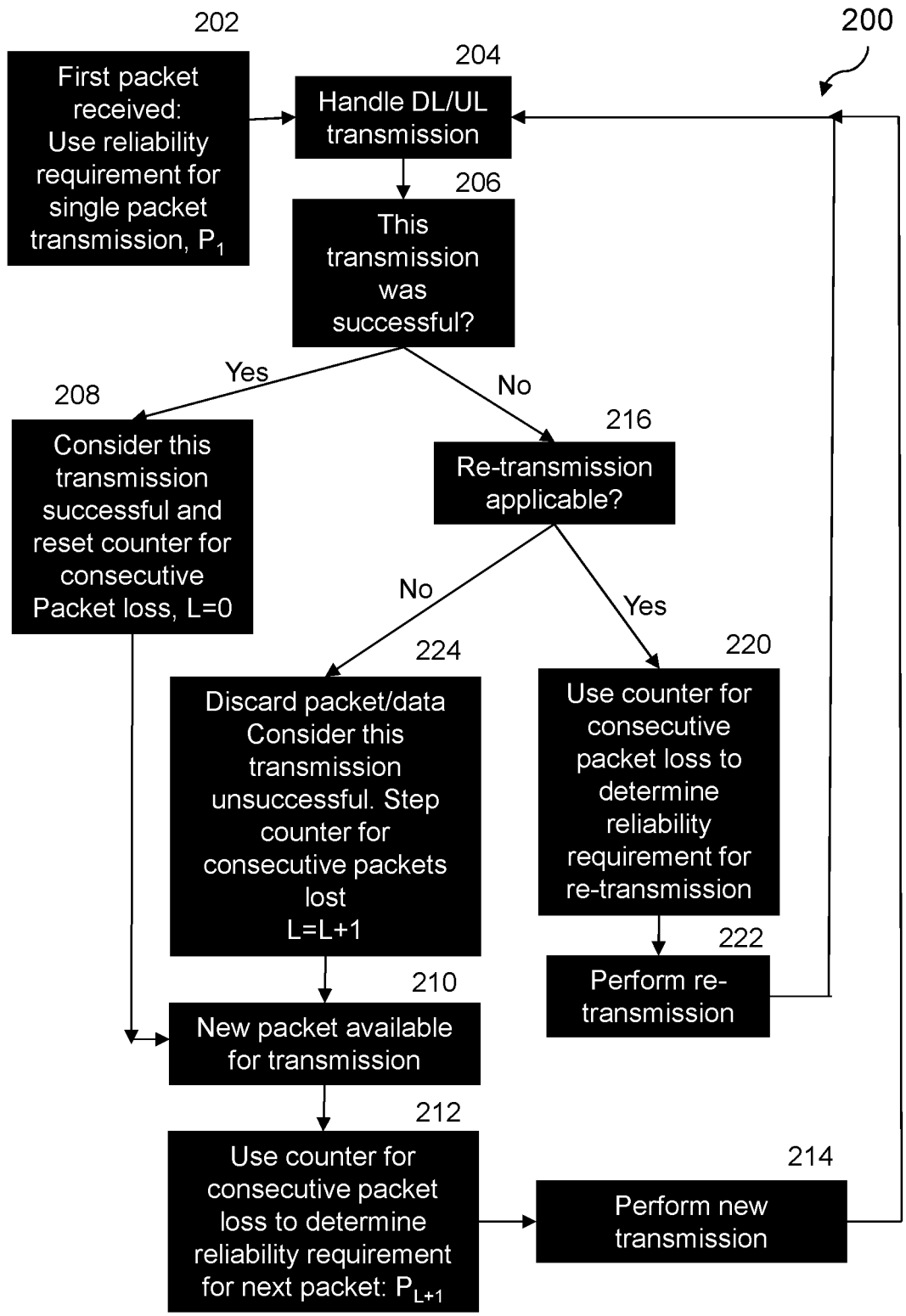
FIG. 9 illustrates an example implementation considering consecutive packet loss as input to link adaptation for new and re-transmissions of the same data flow, according to certain embodiments.

FIG. 9 illustrates an example implementation considering consecutive packet loss as input to link adaptation for new and re-transmissions of the same data flow, according to certain embodiments. At step 202, the first packet is received. A reliability requirement is used for single packet transmission, $P_1$. At step 204, DL/UL transmission is handled.

At step 206, it is determined whether the transmission was successful. If the transmission was successful a rest counter for consecutive packet loss (L) is set to 0, at step 208. At step 210, a new packet is available for transmission. At step 212, the counter is used for consecutive packet loss to determine the reliability requirement for the next packet, $P_L+1$. The transmission of the new packet is performed at step 214, and the method returns to step 204, where the DL/UL transmission is handled Returning to step 206, if it is determined that the transmission of the first packet was unsuccessful, the method proceeds to step 216, where it is determined whether a re-transmission of the first packet is applicable. If re-transmission is applicable, the counter for consecutive packet loss is used to determine the reliability requirement for re-transmission, at step 220. The re-transmission is then performed at step 222.

Conversely, if at step 216 it is determined that re-transmission is not applicable, the packet/data is discarded and the transmission is considered unsuccessful, and the counter for consecutive packets lost is incremented such that L equals L+1, at step 224. The method then returns to step 210, where it is again determined that a new packet is available for transmission. At step 212, the counter is used for consecutive packet loss to determine the reliability requirement for the next packet, $P_{L+1}$. The transmission of the new packet is performed at step 214, and the method returns to step 204, where the DL/UL transmission is handled.

Figure 10:
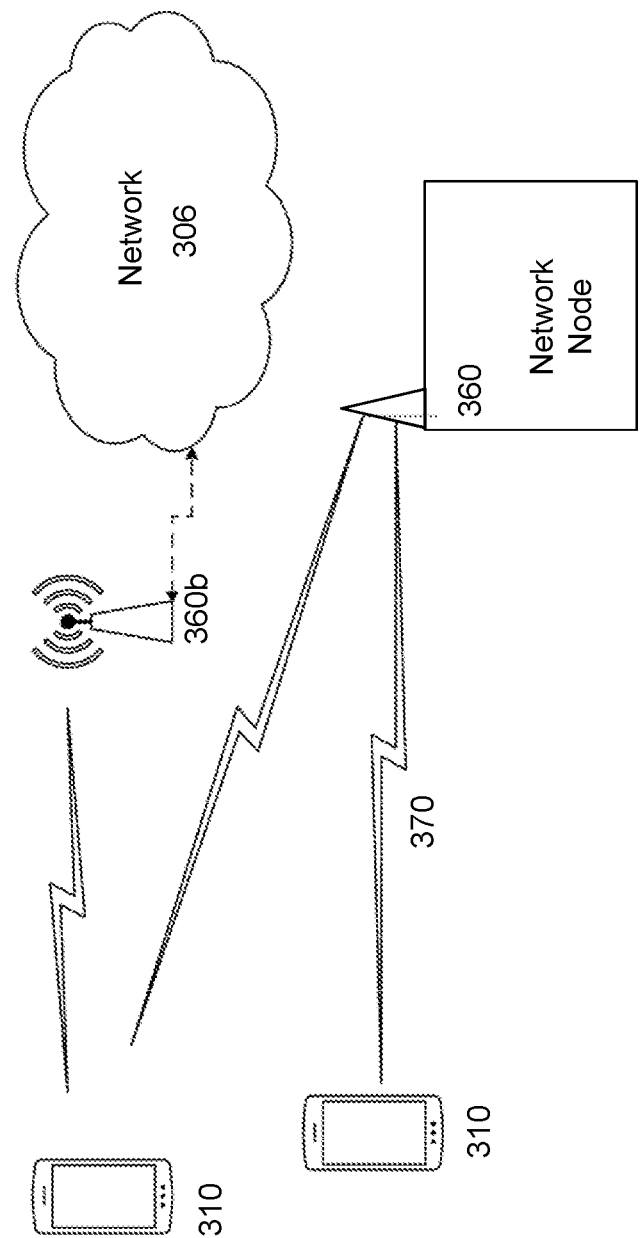
FIG. 10 illustrates an example wireless network, according to certain embodiments.

FIG. 10 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 306, network nodes 360 and 360b, and wireless devices 310, 310b, and 310c. In practice, a wireless network may further include any additional elements suitable to support communication between wireless devices or between a wireless device and another communication device, such as a landline telephone, a service provider, or any other network node or end device. Of the illustrated components, network node 360 and wireless device 310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 360 and wireless device 310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 11:
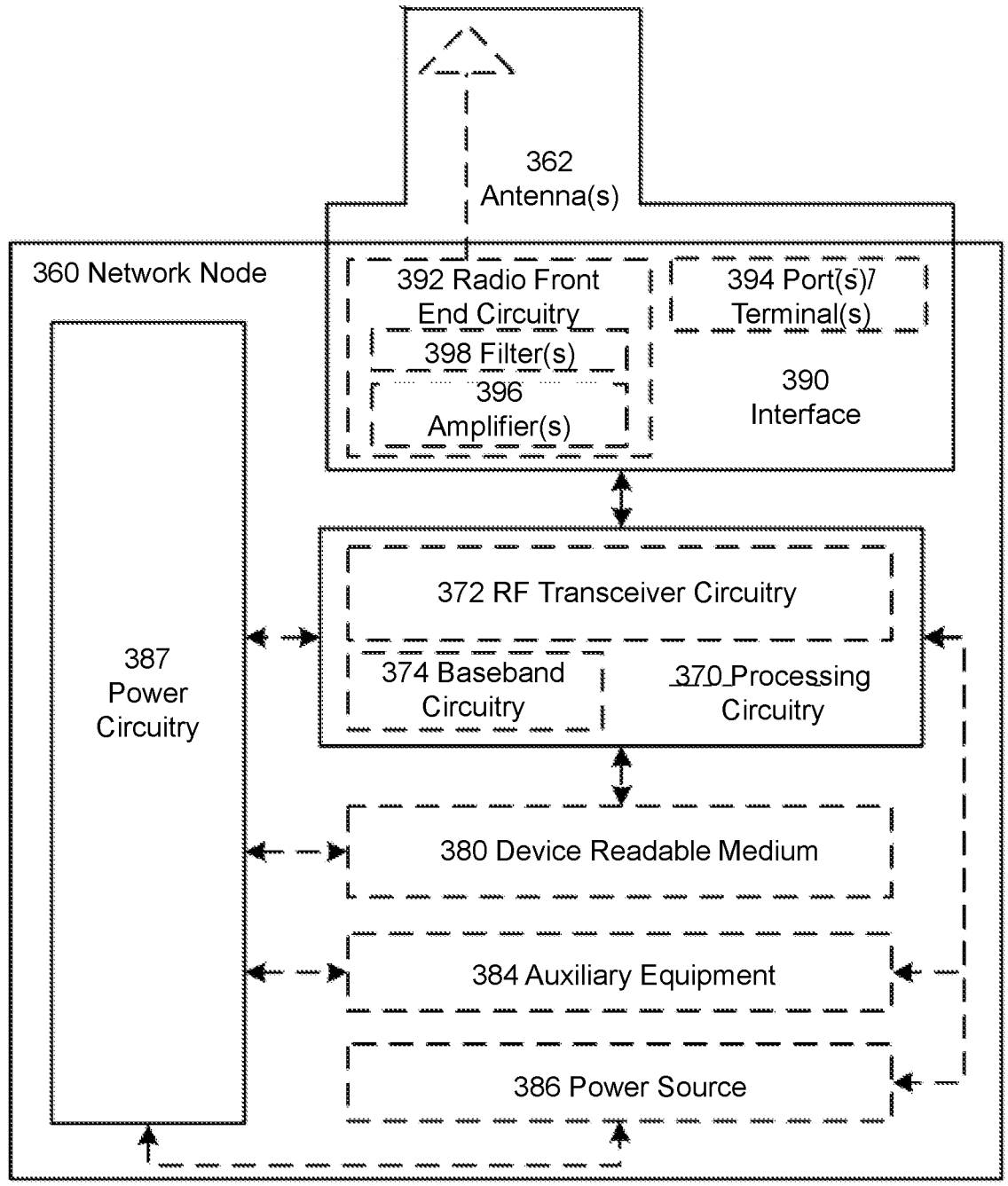
FIG. 11 illustrates an example network node, according to certain embodiments.

FIG. 11 illustrates a network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR Nodes (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 360 includes processing circuitry 370, device readable medium 380, interface 390, auxiliary equipment 384, power source 386, power circuitry 387, and antenna 362. Although network node 360 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 360 are depicted as single boxes located within a larger box, or nested within multiple boxes, in practice, a network node may comprise multiple different physical components that make up a single illustrated component (e.g., device readable medium 380 may comprise multiple separate hard drives as well as multiple RAM modules).

Similarly, network node 360 may be composed of multiple physically separate components (e.g., a NodeB component and a RNC component, or a BTS component and a BSC component, etc.), which may each have their own respective components. In certain scenarios in which network node 360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 360 may be configured to support multiple radio access technologies (RATs). In such embodiments, some components may be duplicated (e.g., separate device readable medium 380 for the different RATs) and some components may be reused (e.g., the same antenna 362 may be shared by the RATs). Network node 360 may also include multiple sets of the various illustrated components for different wireless technologies integrated into network node 360, such as, for example, GSM, Wide Code Division Multiplexing Access (WCDMA), LTE, NR, WiFi, or Bluetooth wireless technologies. These wireless technologies may be integrated into the same or different chip or set of chips and other components within network node 360.

Processing circuitry 370 is configured to perform any determining, calculating, or similar operations (e.g., certain obtaining operations) described herein as being provided by a network node. These operations performed by processing circuitry 370 may include processing information obtained by processing circuitry 370 by, for example, converting the obtained information into other information, comparing the obtained information or converted information to information stored in the network node, and/or performing one or more operations based on the obtained information or converted information, and as a result of said processing making a determination.

Processing circuitry 370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 360 components, such as device readable medium 380, network node 360 functionality. For example, processing circuitry 370 may execute instructions stored in device readable medium 380 or in memory within processing circuitry 370. Such functionality may include providing any of the various wireless features, functions, or benefits discussed herein. In some embodiments, processing circuitry 370 may include a system on a chip (SOC).

In some embodiments, processing circuitry 370 may include one or more of radio frequency (RF) transceiver circuitry 372 and baseband processing circuitry 374. In some embodiments, radio frequency (RF) transceiver circuitry 372 and baseband processing circuitry 374 may be on separate chips (or sets of chips), boards, or units, such as radio units and digital units. In alternative embodiments, part or all of RF transceiver circuitry 372 and baseband processing circuitry 374 may be on the same chip or set of chips, boards, or units.

In certain embodiments, some or all of the functionality described herein as being provided by a network node, base station, eNB or other such network device may be performed by processing circuitry 370 executing instructions stored on device readable medium 380 or memory within processing circuitry 370. In alternative embodiments, some or all of the functionality may be provided by processing circuitry 370 without executing instructions stored on a separate or discrete device readable medium, such as in a hard-wired manner. In any of those embodiments, whether executing instructions stored on a device readable storage medium or not, processing circuitry 370 can be configured to perform the described functionality. The benefits provided by such functionality are not limited to processing circuitry 370 alone or to other components of network node 360 but are enjoyed by network node 360 as a whole, and/or by end users and the wireless network generally.

Device readable medium 380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 370. Device readable medium 380 may store any suitable instructions, data or information, including a computer program, software, an application including one or more of logic, rules, code, tables, etc. and/or other instructions capable of being executed by processing circuitry 370 and, utilized by network node 360. Device readable medium 380 may be used to store any calculations made by processing circuitry 370 and/or any data received via interface 390. In some embodiments, processing circuitry 370 and device readable medium 380 may be considered to be integrated.

Interface 390 is used in the wired or wireless communication of signalling and/or data between network node 360, network 306, and/or wireless devices 310. As illustrated, interface 390 comprises port(s)/terminal(s) 394 to send and receive data, for example to and from network 306 over a wired connection. Interface 390 also includes radio front end circuitry 392 that may be coupled to, or in certain embodiments a part of, antenna 362. Radio front end circuitry 392 comprises filters 398 and amplifiers 396. Radio front end circuitry 392 may be connected to antenna 362 and processing circuitry 370. Radio front end circuitry may be configured to condition signals communicated between antenna 362 and processing circuitry 370. Radio front end circuitry 392 may receive digital data that is to be sent out to other network nodes or wireless devices via a wireless connection. Radio front end circuitry 392 may convert the digital data into a radio signal having the appropriate channel and bandwidth parameters using a combination of filters 398 and/or amplifiers 396. The radio signal may then be transmitted via antenna 362. Similarly, when receiving data, antenna 362 may collect radio signals which are then converted into digital data by radio front end circuitry 392. The digital data may be passed to processing circuitry 370. In other embodiments, the interface may comprise different components and/or different combinations of components.

In certain alternative embodiments, network node 360 may not include separate radio front end circuitry 392, instead, processing circuitry 370 may comprise radio front end circuitry and may be connected to antenna 362 without separate radio front end circuitry 392. Similarly, in some embodiments, all or some of RF transceiver circuitry 372 may be considered a part of interface 390. In still other embodiments, interface 390 may include one or more ports or terminals 394, radio front end circuitry 392, and RF transceiver circuitry 372, as part of a radio unit (not shown), and interface 390 may communicate with baseband processing circuitry 374, which is part of a digital unit (not shown).

Antenna 362 may include one or more antennas, or antenna arrays, configured to send and/or receive wireless signals. Antenna 362 may be coupled to radio front end circuitry 390 and may be any type of antenna capable of transmitting and receiving data and/or signals wirelessly. In some embodiments, antenna 362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 362 may be separate from network node 360 and may be connectable to network node 360 through an interface or port.

Antenna 362, interface 390, and/or processing circuitry 370 may be configured to perform any receiving operations and/or certain obtaining operations described herein as being performed by a network node. Any information, data and/or signals may be received from a wireless device, another network node and/or any other network equipment. Similarly, antenna 362, interface 390, and/or processing circuitry 370 may be configured to perform any transmitting operations described herein as being performed by a network node. Any information, data and/or signals may be transmitted to a wireless device, another network node and/or any other network equipment.

Power circuitry 387 may comprise, or be coupled to, power management circuitry and is configured to supply the components of network node 360 with power for performing the functionality described herein. Power circuitry 387 may receive power from power source 386. Power source 386 and/or power circuitry 387 may be configured to provide power to the various components of network node 360 in a form suitable for the respective components (e.g., at a voltage and current level needed for each respective component). Power source 386 may either be included in, or external to, power circuitry 387 and/or network node 360. For example, network node 360 may be connectable to an external power source (e.g., an electricity outlet) via an input circuitry or interface such as an electrical cable, whereby the external power source supplies power to power circuitry 387. As a further example, power source 386 may comprise a source of power in the form of a battery or battery pack which is connected to, or integrated in, power circuitry 387. The battery may provide backup power should the external power source fail. Other types of power sources, such as photovoltaic devices, may also be used.

Alternative embodiments of network node 360 may include additional components beyond those shown in FIG. 11 that may be responsible for providing certain aspects of the network node's functionality, including any of the functionality described herein and/or any functionality necessary to support the subject matter described herein. For example, network node 360 may include user interface equipment to allow input of information into network node 360 and to allow output of information from network node 360. This may allow a user to perform diagnostic, maintenance, repair, and other administrative functions for network node 360.

Figure 12:
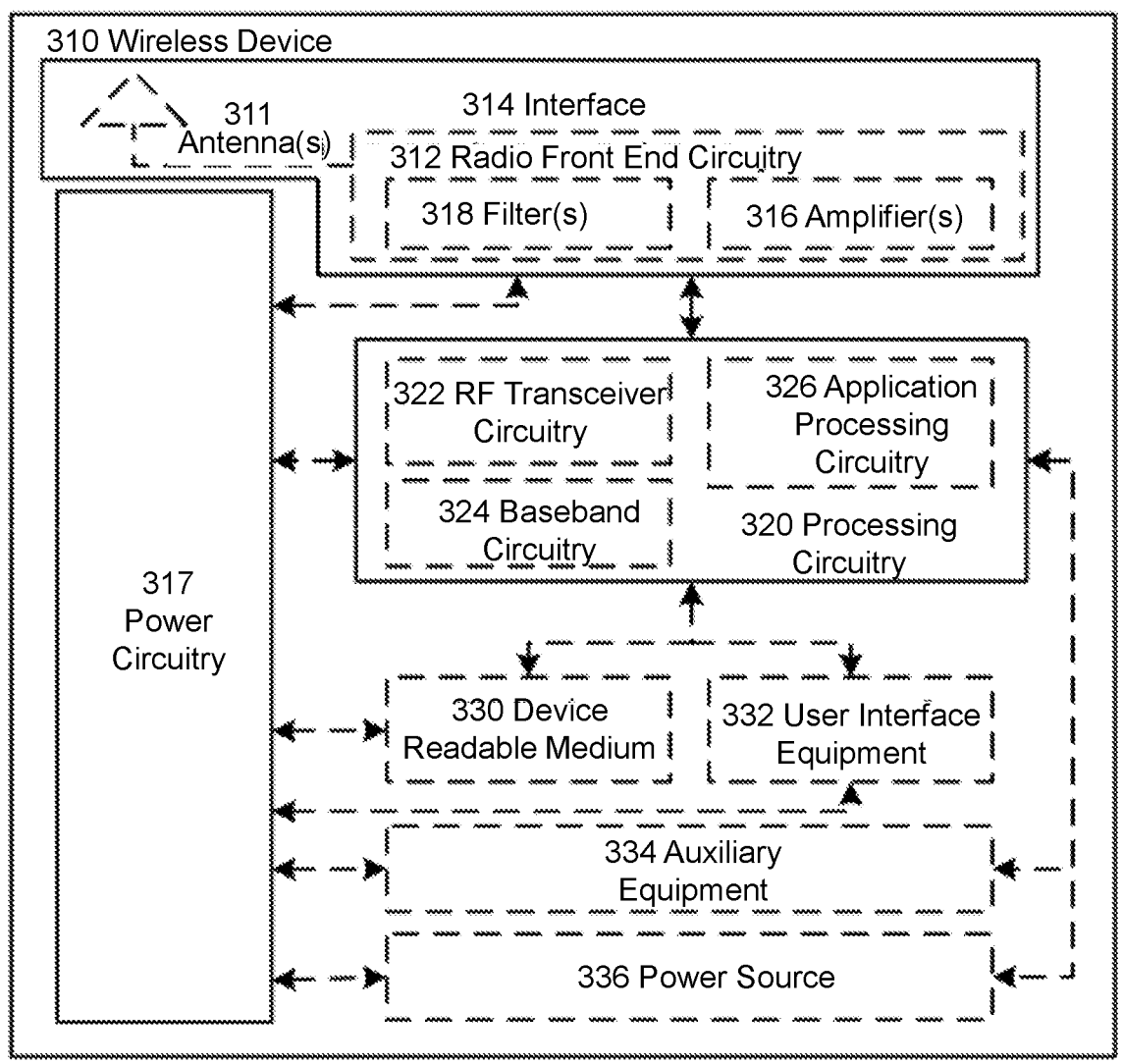
FIG. 12 illustrates an example wireless device, according to certain embodiments.

FIG. 12 illustrates a wireless device 160, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 310 includes antenna 311, interface 314, processing circuitry 320, device readable medium 330, user interface equipment 332, auxiliary equipment 334, power source 336 and power circuitry 337. Wireless device 310 may include multiple sets of one or more of the illustrated components for different wireless technologies supported by wireless device 310, such as, for example, GSM, WCDMA, LTE, NR, WiFi, WiMAX, or Bluetooth wireless technologies, just to mention a few. These wireless technologies may be integrated into the same or different chips or set of chips as other components within wireless device 310.

Antenna 311 may include one or more antennas or antenna arrays, configured to send and/or receive wireless signals, and is connected to interface 314. In certain alternative embodiments, antenna 311 may be separate from wireless device 310 and be connectable to wireless device 310 through an interface or port. Antenna 311, interface 314, and/or processing circuitry 320 may be configured to perform any receiving or transmitting operations described herein as being performed by a wireless device. Any information, data and/or signals may be received from a network node and/or another wireless device. In some embodiments, radio front end circuitry and/or antenna 311 may be considered an interface.

As illustrated, interface 314 comprises radio front end circuitry 312 and antenna 311. Radio front end circuitry 312 comprise one or more filters 318 and amplifiers 316. Radio front end circuitry 314 is connected to antenna 311 and processing circuitry 320 and is configured to condition signals communicated between antenna 311 and processing circuitry 320. Radio front end circuitry 312 may be coupled to or a part of antenna 311. In some embodiments, wireless device 310 may not include separate radio front end circuitry 312; rather, processing circuitry 320 may comprise radio front end circuitry and may be connected to antenna 311. Similarly, in some embodiments, some or all of RF transceiver circuitry 322 may be considered a part of interface 314. Radio front end circuitry 312 may receive digital data that is to be sent out to other network nodes or wireless devices via a wireless connection. Radio front end circuitry 312 may convert the digital data into a radio signal having the appropriate channel and bandwidth parameters using a combination of filters 318 and/or amplifiers 316. The radio signal may then be transmitted via antenna 311. Similarly, when receiving data, antenna 311 may collect radio signals which are then converted into digital data by radio front end circuitry 312. The digital data may be passed to processing circuitry 320. In other embodiments, the interface may comprise different components and/or different combinations of components.

Processing circuitry 320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 310 components, such as device readable medium 330, wireless device 310 functionality. Such functionality may include providing any of the various wireless features or benefits discussed herein. For example, processing circuitry 320 may execute instructions stored in device readable medium 330 or in memory within processing circuitry 320 to provide the functionality disclosed herein.

As illustrated, processing circuitry 320 includes one or more of RF transceiver circuitry 322, baseband processing circuitry 324, and application processing circuitry 326. In other embodiments, the processing circuitry may comprise different components and/or different combinations of components. In certain embodiments processing circuitry 320 of wireless device 310 may comprise a SOC. In some embodiments, RF transceiver circuitry 322, baseband processing circuitry 324, and application processing circuitry 326 may be on separate chips or sets of chips. In alternative embodiments, part or all of baseband processing circuitry 324 and application processing circuitry 326 may be combined into one chip or set of chips, and RF transceiver circuitry 322 may be on a separate chip or set of chips. In still alternative embodiments, part or all of RF transceiver circuitry 322 and baseband processing circuitry 324 may be on the same chip or set of chips, and application processing circuitry 326 may be on a separate chip or set of chips. In yet other alternative embodiments, part or all of RF transceiver circuitry 322, baseband processing circuitry 324, and application processing circuitry 326 may be combined in the same chip or set of chips. In some embodiments, RF transceiver circuitry 322 may be a part of interface 314. RF transceiver circuitry 322 may condition RF signals for processing circuitry 320.

In certain embodiments, some or all of the functionality described herein as being performed by a wireless device may be provided by processing circuitry 320 executing instructions stored on device readable medium 330, which in certain embodiments may be a computer-readable storage medium. In alternative embodiments, some or all of the functionality may be provided by processing circuitry 320 without executing instructions stored on a separate or discrete device readable storage medium, such as in a hard-wired manner. In any of those particular embodiments, whether executing instructions stored on a device readable storage medium or not, processing circuitry 320 can be configured to perform the described functionality. The benefits provided by such functionality are not limited to processing circuitry 320 alone or to other components of wireless device 310, but are enjoyed by wireless device 310 as a whole, and/or by end users and the wireless network generally.

Processing circuitry 320 may be configured to perform any determining, calculating, or similar operations (e.g., certain obtaining operations) described herein as being performed by a wireless device. These operations, as performed by processing circuitry 320, may include processing information obtained by processing circuitry 320 by, for example, converting the obtained information into other information, comparing the obtained information or converted information to information stored by wireless device 310, and/or performing one or more operations based on the obtained information or converted information, and as a result of said processing making a determination.

Device readable medium 330 may be operable to store a computer program, software, an application including one or more of logic, rules, code, tables, etc. and/or other instructions capable of being executed by processing circuitry 320. Device readable medium 330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 320. In some embodiments, processing circuitry 320 and device readable medium 330 may be considered to be integrated.

User interface equipment 332 may provide components that allow for a human user to interact with wireless device 310. Such interaction may be of many forms, such as visual, audial, tactile, etc. User interface equipment 332 may be operable to produce output to the user and to allow the user to provide input to wireless device 310. The type of interaction may vary depending on the type of user interface equipment 332 installed in wireless device 310. For example, if wireless device 310 is a smart phone, the interaction may be via a touch screen; if wireless device 310 is a smart meter, the interaction may be through a screen that provides usage (e.g., the number of gallons used) or a speaker that provides an audible alert (e.g., if smoke is detected). User interface equipment 332 may include input interfaces, devices and circuits, and output interfaces, devices and circuits. User interface equipment 332 is configured to allow input of information into wireless device 310 and is connected to processing circuitry 320 to allow processing circuitry 320 to process the input information. User interface equipment 332 may include, for example, a microphone, a proximity or other sensor, keys/buttons, a touch display, one or more cameras, a USB port, or other input circuitry. User interface equipment 332 is also configured to allow output of information from wireless device 310, and to allow processing circuitry 320 to output information from wireless device 310. User interface equipment 332 may include, for example, a speaker, a display, vibrating circuitry, a USB port, a headphone interface, or other output circuitry. Using one or more input and output interfaces, devices, and circuits, of user interface equipment 332, wireless device 310 may communicate with end users and/or the wireless network and allow them to benefit from the functionality described herein.

Auxiliary equipment 334 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 334 may vary depending on the embodiment and/or scenario.

Power source 336 may, in some embodiments, be in the form of a battery or battery pack. Other types of power sources, such as an external power source (e.g., an electricity outlet), photovoltaic devices or power cells, may also be used. Wireless device 310 may further comprise power circuitry 337 for delivering power from power source 336 to the various parts of wireless device 310 which need power from power source 336 to carry out any functionality described or indicated herein. Power circuitry 337 may in certain embodiments comprise power management circuitry. Power circuitry 337 may additionally or alternatively be operable to receive power from an external power source; in which case wireless device 310 may be connectable to the external power source (such as an electricity outlet) via input circuitry or an interface such as an electrical power cable. Power circuitry 337 may also in certain embodiments be operable to deliver power from an external power source to power source 336. This may be, for example, for the charging of power source 336. Power circuitry 337 may perform any formatting, converting, or other modification to the power from power source 336 to make the power suitable for the respective components of wireless device 310 to which power is supplied.

Figure 13:
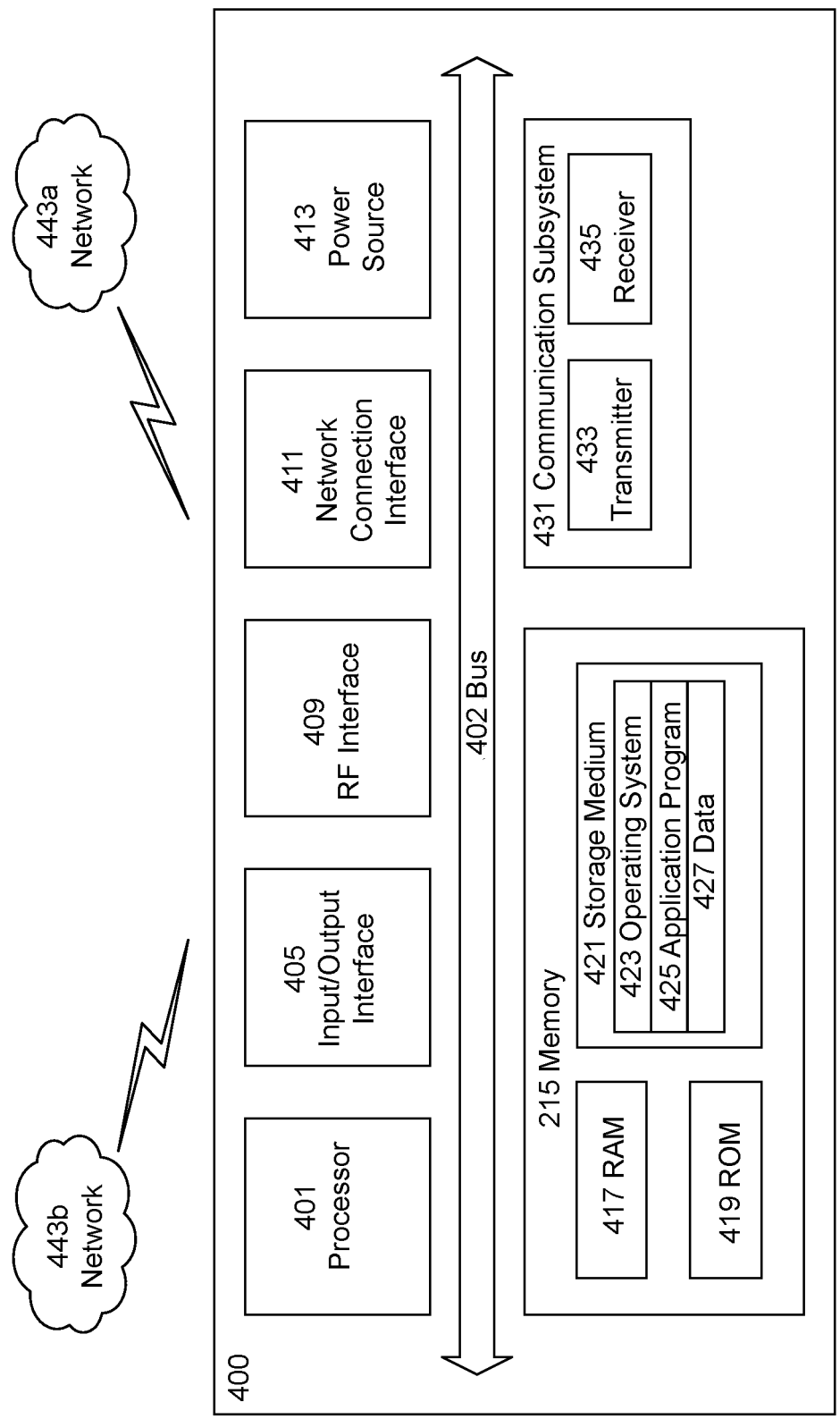
FIG. 13 illustrate an example user equipment, according to certain embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the $3^{rd}$ Generation Partnership Project (3GPP), including a NB-IoT UE, a machine type communication (MTC) UE, and/or an enhanced MTC (eMTC) UE. UE 400, as illustrated in FIG. 13, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 13 is a UE, the components discussed herein are equally applicable to a wireless device, and vice-versa.

In FIG. 13, UE 400 includes processing circuitry 401 that is operatively coupled to input/output interface 405, radio frequency (RF) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 409 may be configured to provide a communication interface to RF components such as a transmitter, a receiver, and an antenna. Network connection interface 411 may be configured to provide a communication interface to network 443a. Network 443a may encompass wired and/or wireless networks such as a local-area network (LAN), a wide-area network (WAN), a computer network, a wireless network, a telecommunications network, another like network or any combination thereof. For example, network 443a may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 13, processing circuitry 401 may be configured to communicate with network 443*b* using communication subsystem 431. Network 443*a* and network 443*b* may be the same network or networks or different network or networks. Communication subsystem 431 may be configured to include one or more transceivers used to communicate with network 443*b*. For example, communication subsystem 431 may be configured to include one or more transceivers used to communicate with one or more remote transceivers of another device capable of wireless communication such as another wireless device, UE, or base station of a radio access network (RAN) according to one or more communication protocols, such as IEEE 802.4, CDMA, WCDMA, GSM, LTE, UTRAN, WiMax, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 443*b* may encompass wired and/or wireless networks such as a local-area network (LAN), a wide-area network (WAN), a computer network, a wireless network, a telecommunications network, another like network or any combination thereof. For example, network 443*b* may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Figure 14:
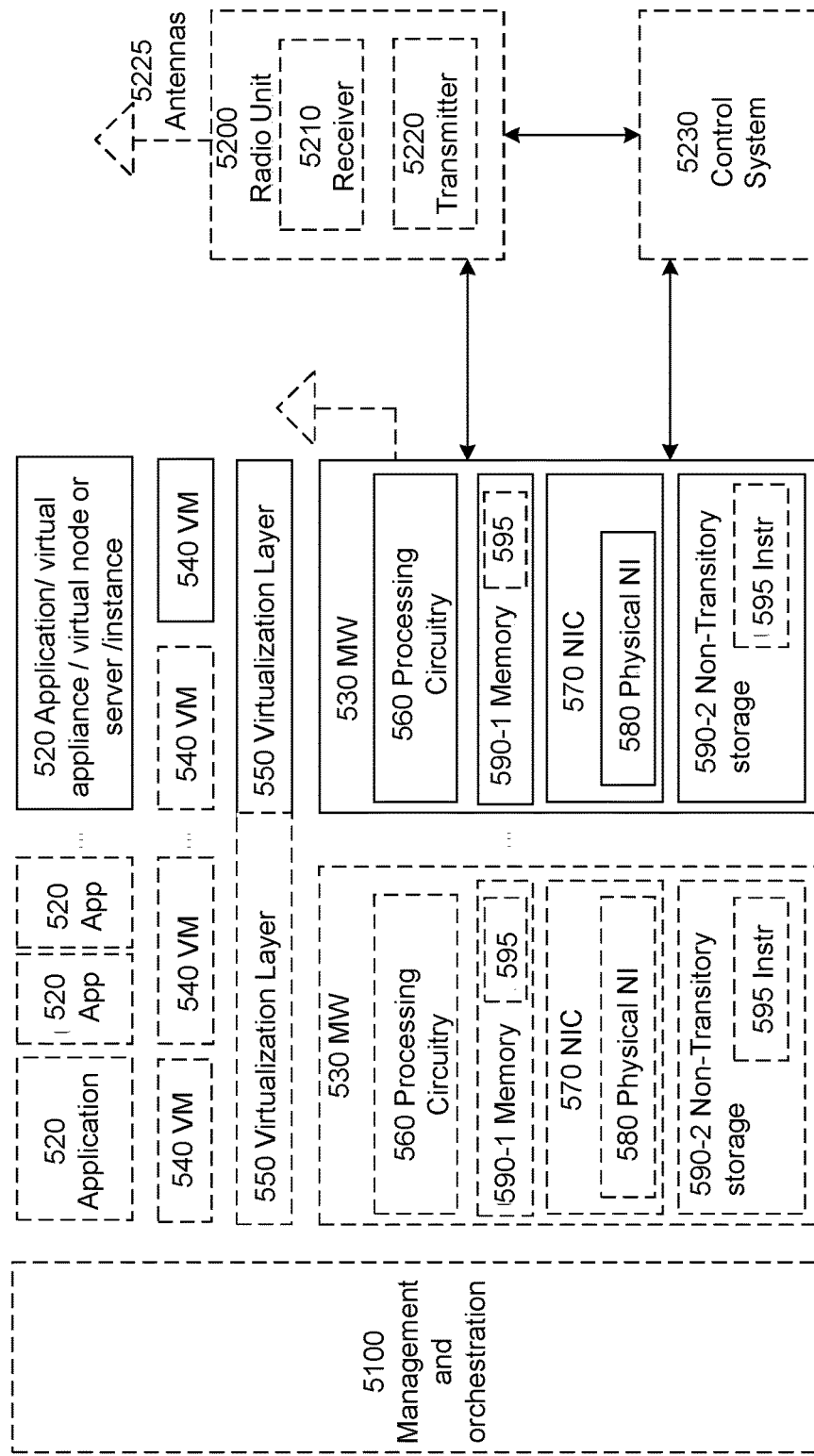
FIG. 14 illustrates a virtualization environment in which functions implemented by some embodiments may be virtualized, according to certain embodiments.

FIG. 14 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 14, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CPE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 14.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signaling can be affected with the use of control system 5230 which may alternatively be used for communication between the hardware nodes 530 and radio units 5200.

Figure 15:
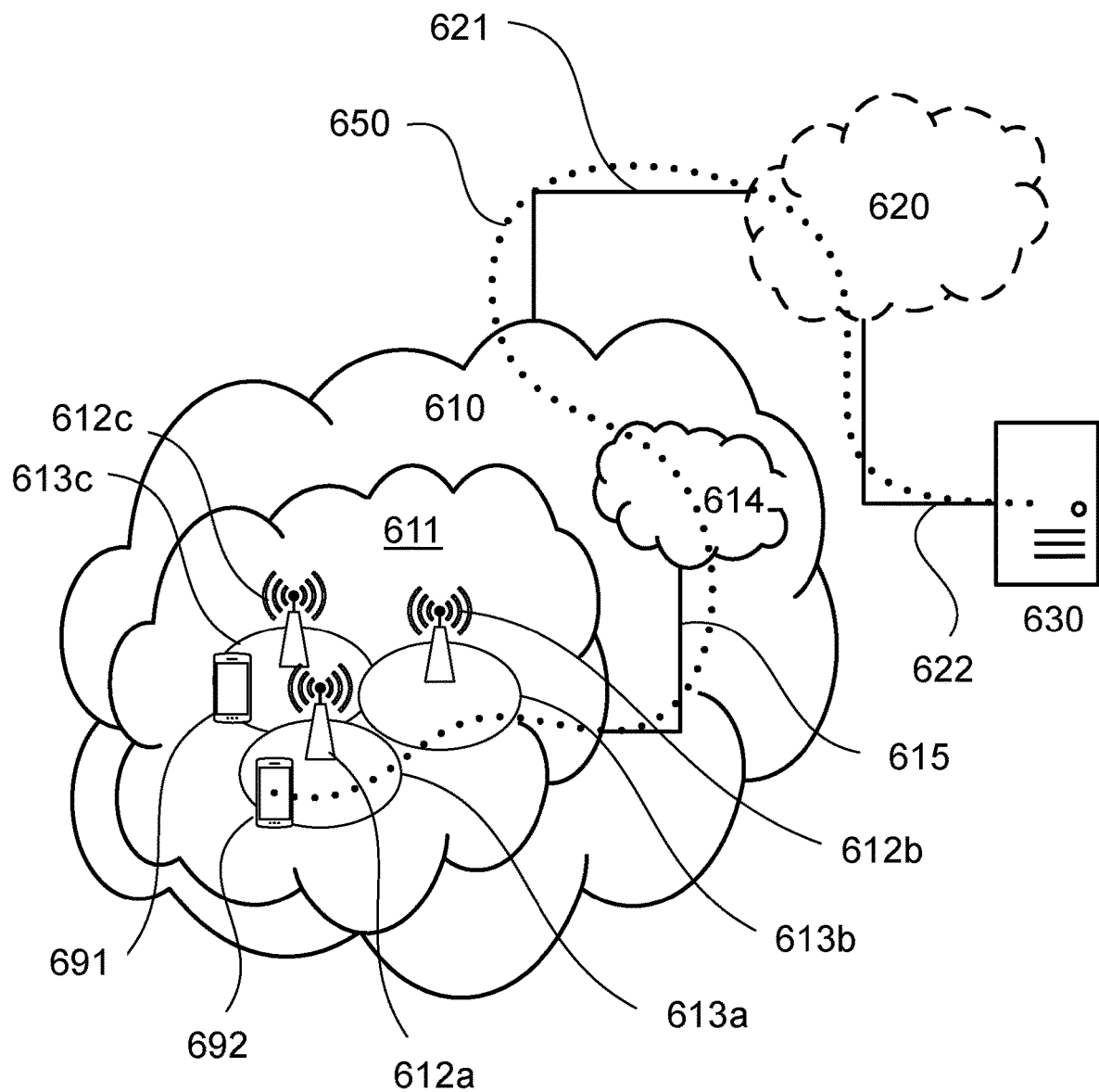
FIG. 15 illustrates a telecommunication network connected via an intermediate network to a host computer, according to certain embodiments.

FIG. 15 illustrates a telecommunication network connected via an intermediate network to a host computer in accordance with some embodiments.

With reference to FIG. 15, in accordance with an embodiment, a communication system includes telecommunication network 610, such as a 3GPP-type cellular network, which comprises access network 611, such as a radio access network, and core network 614. Access network 611 comprises a plurality of base stations 612a, 612b, 612c, such as NBs, eNBs, gNBs or other types of wireless access points, each defining a corresponding coverage area 613a, 613b, 613c. Each base station 612a, 612b, 612c is connectable to core network 614 over a wired or wireless connection 615. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more subnetworks (not shown).

The communication system of FIG. 15 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Figure 16:
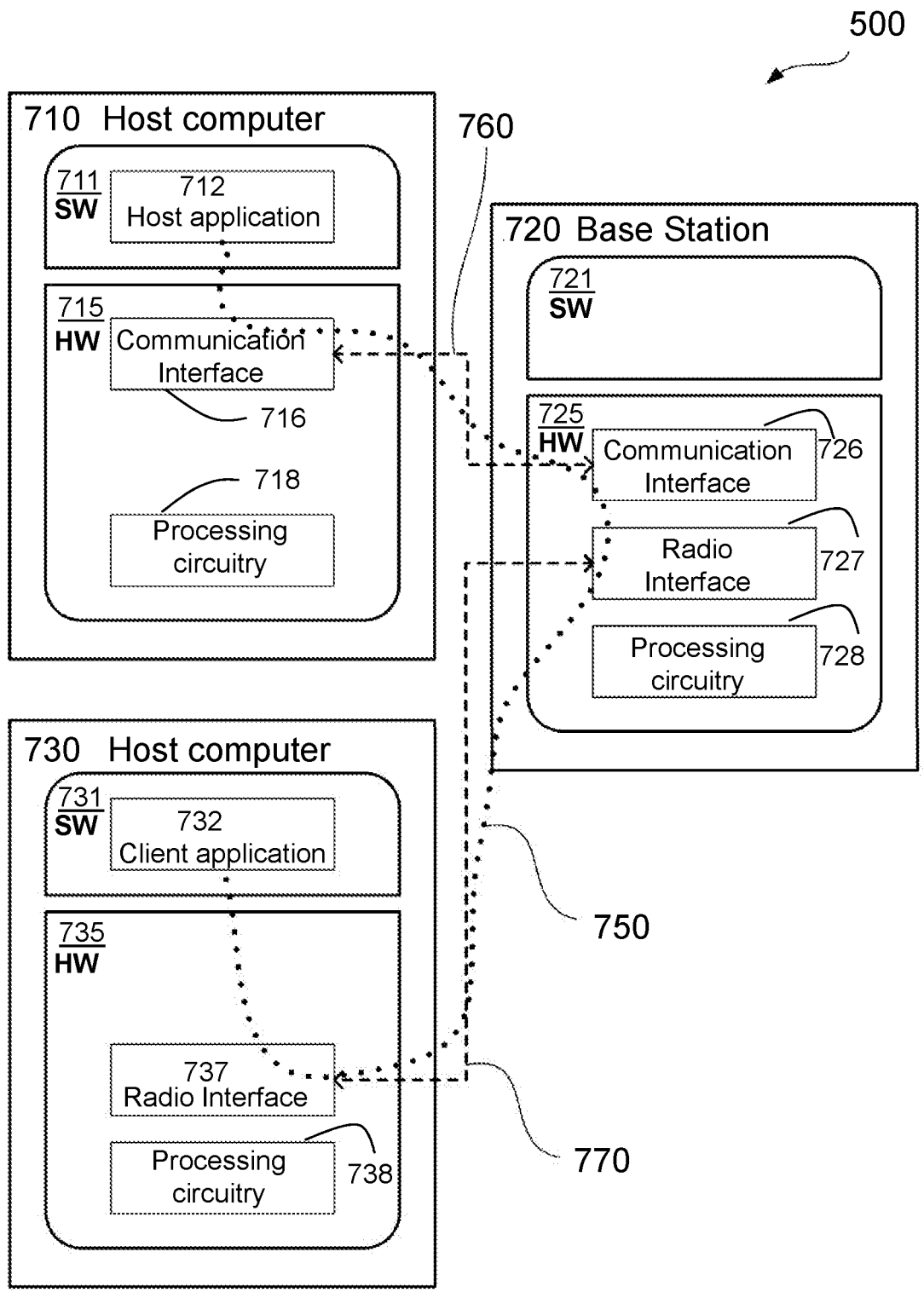
FIG. 16 illustrates a generalized block diagram of a host computer communicating via a base station with a user equipment over a partially wireless connection, according to certain embodiments.

FIG. 16 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 16. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 16) served by base station 720. Communication interface 726 may be configured to facilitate connection 760 to host computer 710. Connection 760 may be direct or it may pass through a core network (not shown in FIG. 16) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

It is noted that host computer 710, base station 720 and UE 730 illustrated in FIG. 16 may be similar or identical to host computer 630, one of base stations 612*a*, 612*b*, 612*c* and one of UEs 691, 692 of FIG. 15, respectively. This is to say, the inner workings of these entities may be as shown in FIG. 16 and independently, the surrounding network topology may be that of FIG. 15.

In FIG. 16, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

Figures 17, 18:
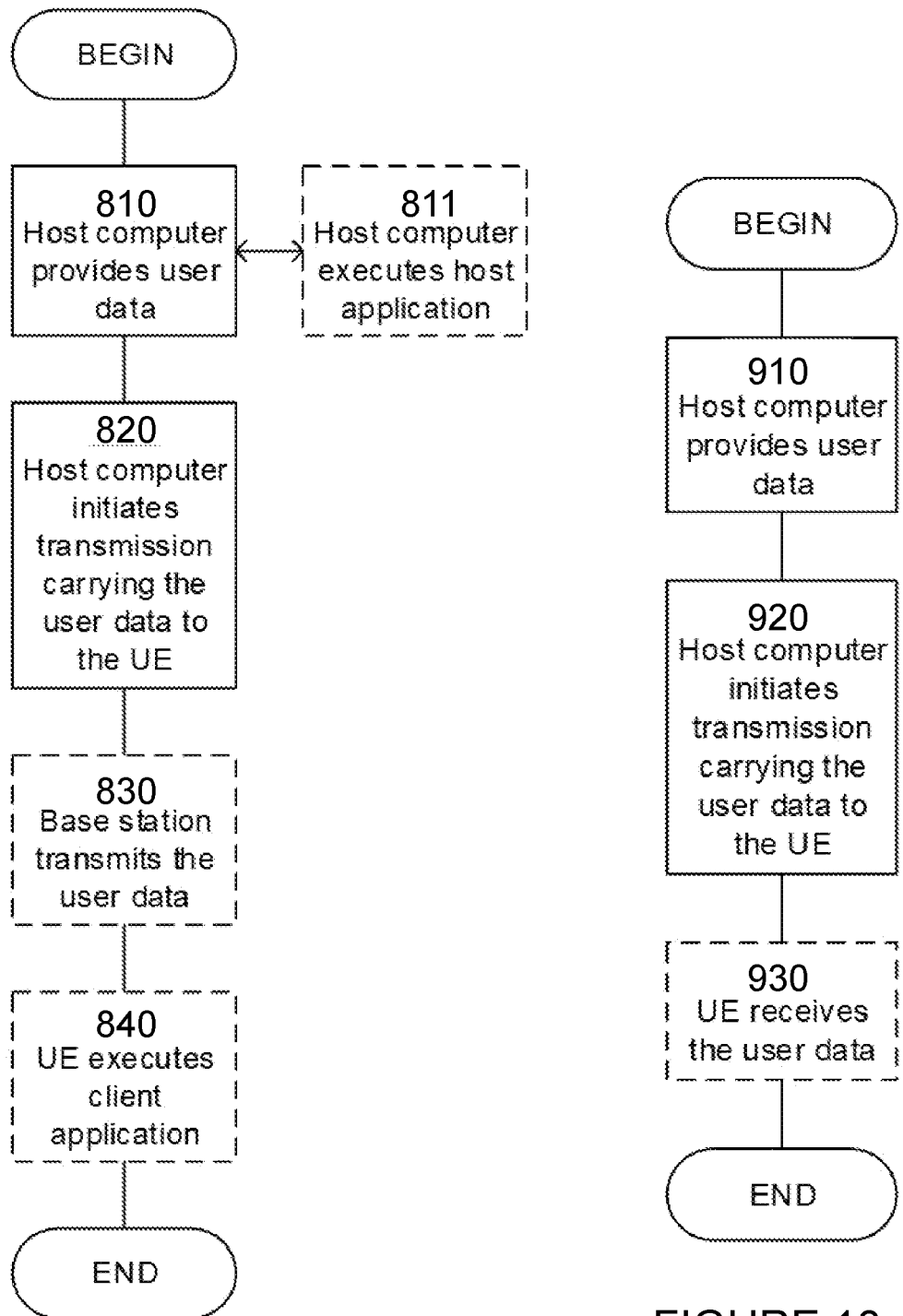
FIG. 17 illustrates a method implemented in a communication system, according to one embodiment.
FIG. 18 illustrates another method implemented in a communication system, according to one embodiment.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

Figures 19, 20:
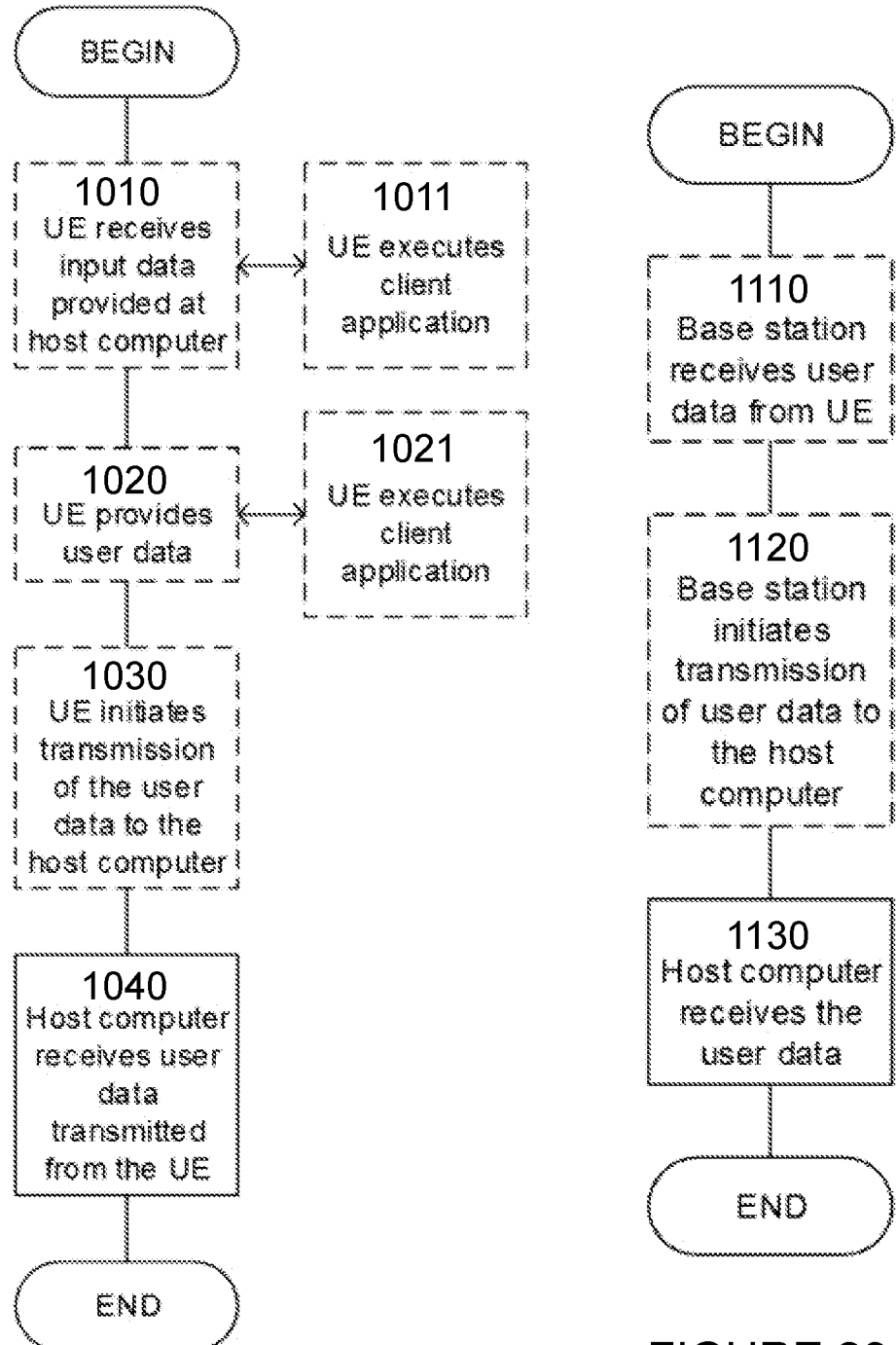
FIG. 19 illustrates another method implemented in a communication system, according to one embodiment.
FIG. 20 illustrates another method implemented in a communication system, according to one embodiment.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, in accordance with the teachings of the embodiments described throughout this disclosure.

Figure 6:
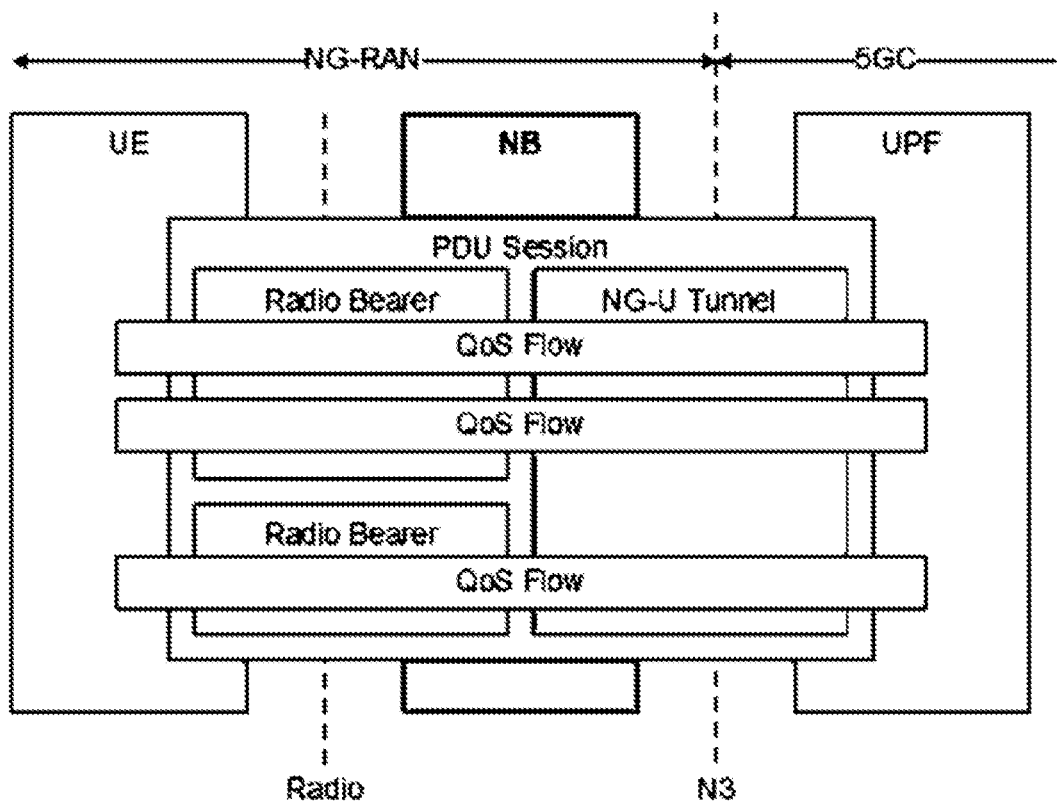
FIG. 6 illustrates an overview of the QoS framework in 5GS.
Figure 7:
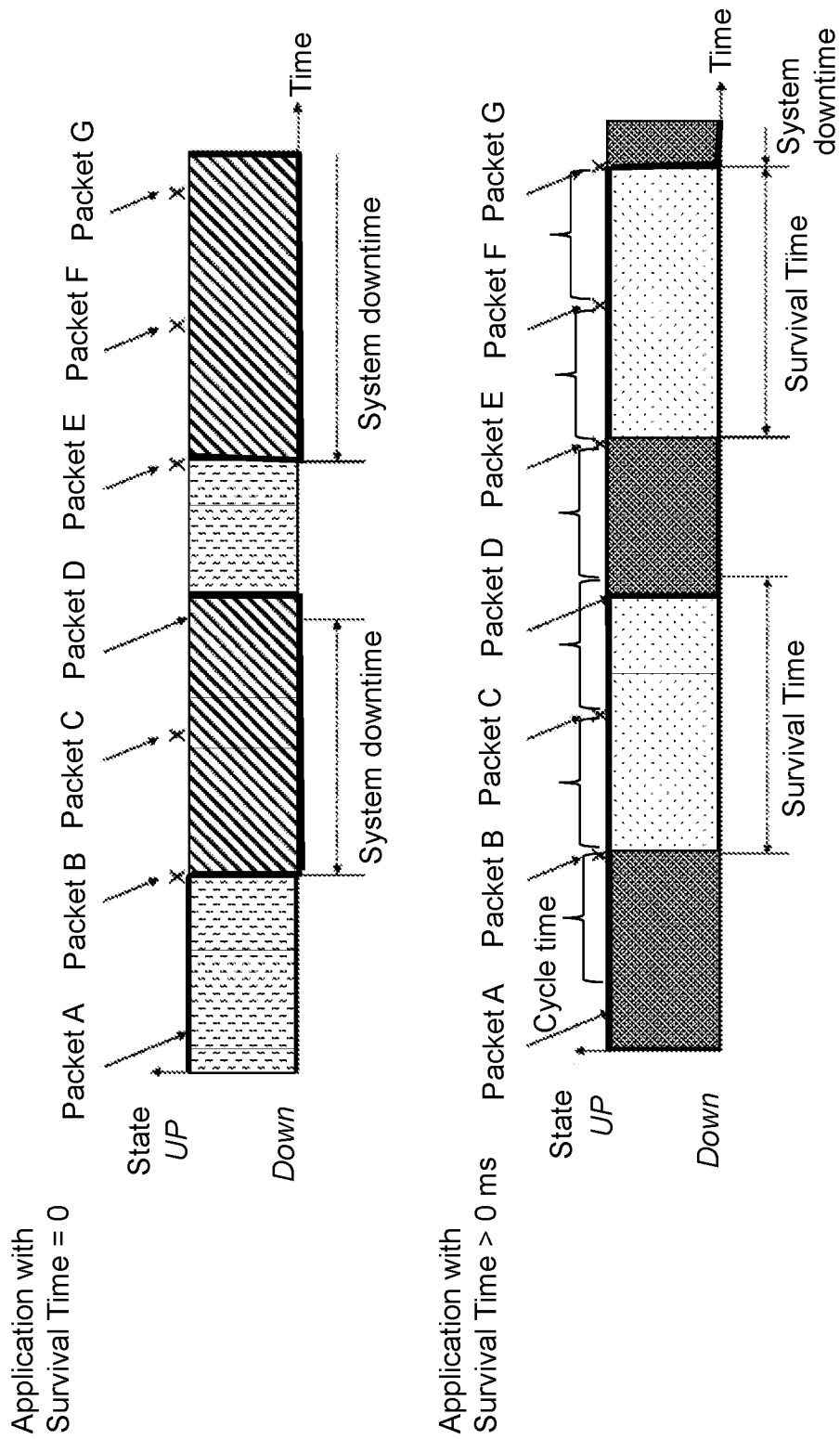
FIG. 7 illustrates examples of how two different applications experience the same sequence of events.

FIG. 20 is a flowchart illustrating a method implemented in a communication system, in accordance with one embodiment. The communication system includes a host computer, a base station and a UE which may be those described with reference to FIGS. 15 and 6 For simplicity of the present disclosure, only drawing references to FIG. 20 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Figure 21:
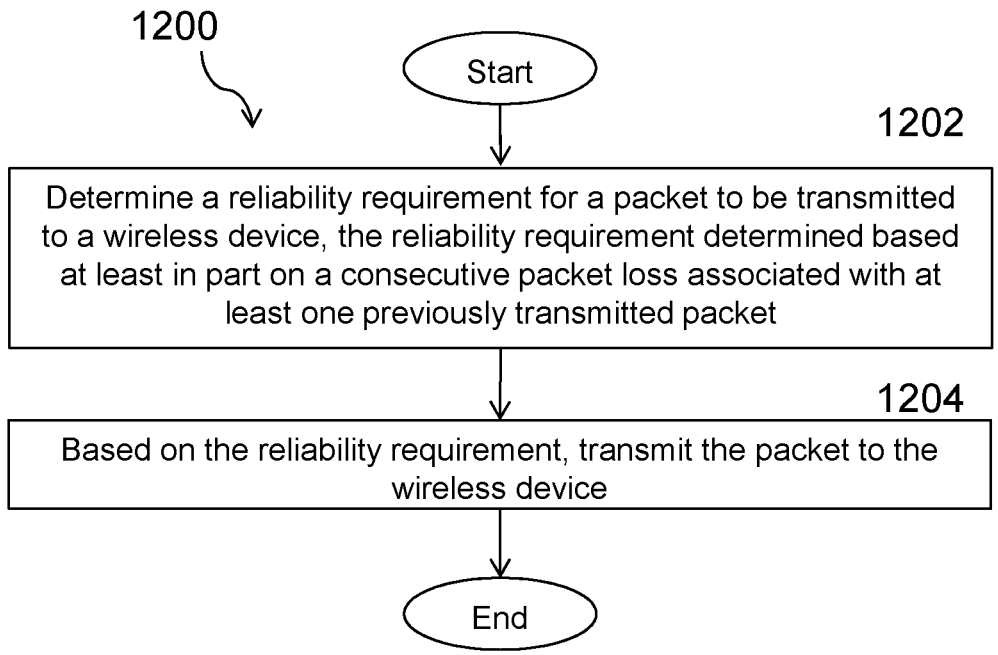
FIG. 21 illustrates an example method by a base station, according to certain embodiments.

FIG. 21 depicts a method 1200 by a network node 360 for improving network efficiency, according to certain embodiments. The method begins at step 1202 when the network node 360 determines a reliability requirement for a packet to be transmitted to a wireless device 310. The reliability requirement may be determined based at least in part on a consecutive packet loss associated with at least one previously transmitted packet. At step 1204, based on the reliability requirement, the network node 360 transmits the packet to the wireless device 310. In a particular embodiment, the network node 360 is a base station.

In a particular embodiment, the reliability requirement includes a survival time window during which a desired level of quality of service, QoS, must be fulfilled. When meeting the desired level of QoS, at least one packet is successfully delivered during the survival time window.

In a particular embodiment, the network node 360 determines a number of packets that can be lost during the survival time window.

In a particular embodiment, the survival time window includes a sum of a transfer time or packet delay budget of the packet and a survival time of an application.

In a particular embodiment, the network node 360 obtains the survival time window as part of a QoS profile configuration.

In a particular embodiment, the QoS profile configuration is associated with a bearer set up to carry a flow associated with the packet.

In a particular embodiment, the packet is a new data packet within a data flow including the at least one previously transmitted packet.

In a particular embodiment, the network node 360 adjusts a Block Error Rate, BLER, target of the packet based on the reliability requirement.

In a particular embodiment, when determining the reliability requirement for the packet to be transmitted to the wireless device, the network node 360 determines an estimated number of remaining transmissions to be transmitted within a survival time window and determines the reliability requirement based on the estimated number of remaining transmissions.

In a particular embodiment, the network node 360 adjusts a Modulation and Coding Scheme, MCS, of the packet based on the reliability requirement.

In a particular embodiment, the network node 360 determines that the transmission of the at least one previously transmitted packet was unsuccessful and determines the reliability requirement based on the transmission of at least one previously transmitted packet being unsuccessful.

In a particular embodiment, the reliability requirement is applied on a retransmission of the packet.

In a particular embodiment, the retransmission comprises a Packet Data Convergence Protocol, Hybrid Automatic Repeat Request, or Radio Link Control retransmission.

In a particular embodiment, the network node 360 adjusts a transmit power of the packet based on the reliability requirement.

In a particular embodiment, the network node 360 blanks an interfering transmission point based on the reliability requirement.

In a particular embodiment, the network node 360 transmits the packet from multiple transmission points based on the reliability requirement.

In a particular embodiment, the network node 360 determines that a threshold number of unsuccessful consecutive transmissions have occurred and takes at least one action selected from: triggering an alarm; triggering a notification; and gathering statistics related to packet loss.

In a particular embodiment, the network node 360 determines that the at least one previously transmitted packet was transmitted unsuccessfully and prioritizes the transmission of the packet to the wireless device 310 over a transmission of another packet.

In a particular embodiment, when transmitting the packet based on the reliability requirement, the network node 360 transmits the packet using repetitions based on the reliability requirement.

In a particular embodiment, when transmitting the packet based on the reliability requirement, the network node 360 transmits the packet using transmit diversity instead of MIMO based on the reliability requirement.

In a particular embodiment, the network node comprises an eNB or gNB.

Figure 22:
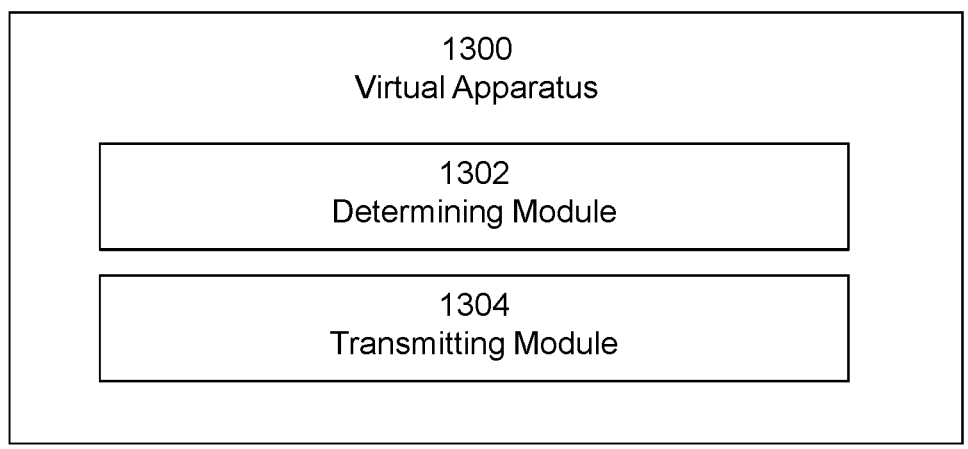
FIG. 22 illustrates an exemplary virtual computing device, according to certain embodiments.

FIG. 22 illustrates a schematic block diagram of a virtual apparatus 1300 in a wireless network (for example, the wireless network shown in FIG. 10). The apparatus may be implemented in a wireless device or network node (e.g., wireless device 310 or network node 360 shown in FIG. 10). Apparatus 1300 is operable to carry out the example method described with reference to FIG. 21 and possibly any other processes or methods disclosed herein. It is also to be understood that the method of FIG. 21 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module 1302, transmitting module 1304, and any other suitable units of apparatus 1300 to perform corresponding functions according one or more embodiments of the present disclosure.

According to certain embodiments, determining module 1302 may perform certain of the determining functions of the apparatus 1300. For example, determining module 1302 may determine a reliability requirement for a packet to be transmitted to a wireless device. The reliability requirement may be determined based at least in part on a consecutive packet loss associated with at least one previously transmitted packet.

According to certain embodiments, transmitting module 1304 may perform certain of the transmitting functions of the apparatus 1300. For example, transmitting module 1304 may transmit the packet to the wireless device based on the reliability requirement.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 23:
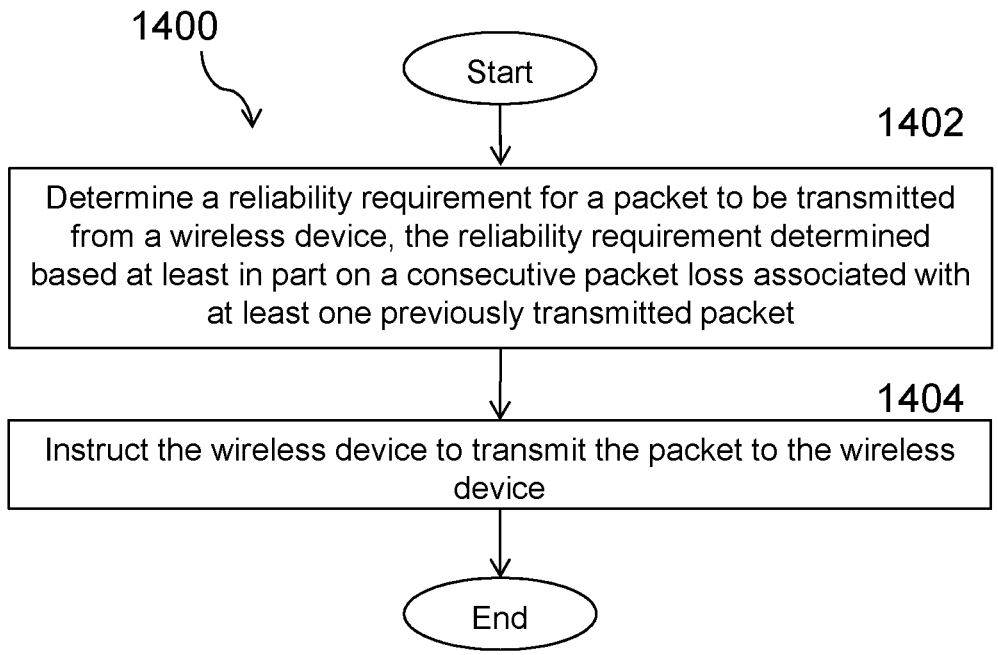
FIG. 23 illustrates another example method by a base station, according to certain embodiments.

FIG. 23 depicts a method 1400 by a network node 360, according to certain embodiments. The method begins at step 1402 when network node 360 determines a reliability requirement for a packet to be transmitted from a wireless device 310. The reliability requirement is determined based at least in part on a consecutive packet loss associated with at least one previously transmitted packet. At step 1404, the network node 360 instructs the wireless device 310 to transmit the packet according to the reliability requirement.

In a particular embodiment, the network node 360 includes a base station.

In a particular embodiment, the reliability requirement includes a survival time window during which a desired level of QoS must be fulfilled. When meeting the desired level of QoS, at least one packet is successfully delivered during the survival time window.

In a particular embodiment, the network node 360 determines a number of packets that can be lost during the survival time window.

In a particular embodiment, the survival time window includes a sum of a transfer time or packet delay budget of the packet and a survival time of an application.

In a particular embodiment, the network node obtains the survival time window as part of a QoS profile configuration.

In a particular embodiment, the QoS profile configuration is associated with a bearer set up to carry a flow associated with the packet.

In a particular embodiment, the packet is a new data packet within a data flow including the at least one previously transmitted packet.

In a particular embodiment, the network node 360 adjusts a Block Error Rate, BLER, target of the packet based on the reliability requirement.

In a particular embodiment, when determining the reliability requirement for the packet to be transmitted from the wireless device, the network node 360 determines an estimated number of remaining transmissions to be transmitted within a survival time window and determines the reliability requirement based on the estimated number of remaining transmissions.

In a particular embodiment, the network node 360 adjusts a MCS of the packet based on the reliability requirement.

In a particular embodiment, the network node 360 determines that the transmission of the at least one previously transmitted packet was unsuccessful and determines the reliability requirement based on the transmission of at least one previously transmitted packet being unsuccessful.

In a particular embodiment, the reliability requirement is applied on a retransmission of the packet.

In a particular embodiment, the retransmission comprises a PDCP, HARQ, or RLC retransmission.

In a particular embodiment, the network node 360 instructs the wireless device to adjust a transmit power of the packet based on the reliability requirement.

In a particular embodiment, the network node 360 blanks an interfering transmission point based on the reliability requirement.

In a particular embodiment, the network node 360 instructs the wireless device to transmit the packet from multiple transmission points based on the reliability requirement In a particular embodiment, the network node 360 determines that a threshold number of unsuccessful consecutive transmissions have occurred and taking at least one action selected from: triggering an alarm; triggering a notification; and gathering statistics related to packet loss.

In a particular embodiment, the network node 360 determines that the at least one previously transmitted packet was transmitted unsuccessfully and instructs the wireless device to prioritize the transmission of the packet from the wireless device over a transmission of another packet.

In a particular embodiment, when instructing the wireless device 310 to transmit the packet, the network node 360 instructs the wireless device 310 to transmit the packet using repetitions based on the reliability requirement.

In a particular embodiment, when instructing the wireless device 310 to transmit the packet, the network node 360 instructs the wireless device 310 to transmit the packet using transmit diversity instead of MIMO based on the reliability requirement.

In a particular embodiment, the network node comprises an eNB or gNB.

Figure 24:
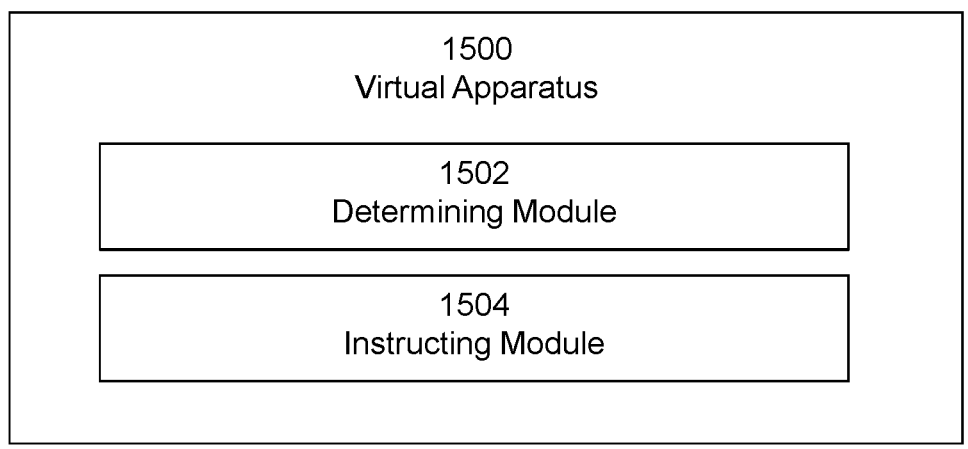
FIG. 24 illustrates another exemplary virtual computing device, according to certain embodiments.

FIG. 24 illustrates a schematic block diagram of a virtual apparatus 1500 in a wireless network (for example, the wireless network shown in FIG. 10). The apparatus may be implemented in a wireless device or network node (e.g., wireless device 310 or network node 360 shown in FIG. 10). Apparatus 1300 is operable to carry out the example method described with reference to FIG. 23 and possibly any other processes or methods disclosed herein. It is also to be understood that the method of FIG. 23 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module 1502, instructing module 1504, and any other suitable units of apparatus 1500 to perform corresponding functions according one or more embodiments of the present disclosure.

According to certain embodiments, determining module 1502 may perform certain of the determining functions of the apparatus 1500. For example, determining module 1502 may determine a reliability requirement for a packet to be transmitted from a wireless device 310. The reliability requirement is determined based at least in part on a consecutive packet loss associated with at least one previously transmitted packet.

According to certain embodiments, instructing module 1504 may perform certain of the instructing functions of the apparatus 1500. For example, instructing module 1504 may instruct the wireless device 310 to transmit the packet according to the reliability requirement.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 25:
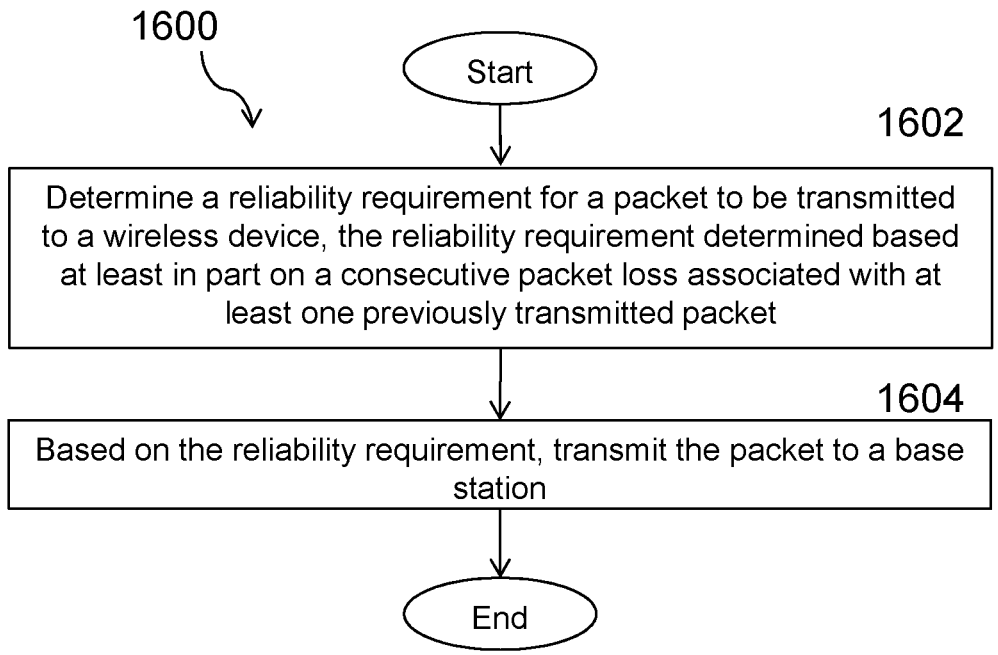
FIG. 25 illustrates an example method by a wireless device, according to certain embodiments.

FIG. 25 depicts a method 1600 by a wireless device 310 such as a UE, according to certain embodiments. The method begins at step 1602 when the wireless device determines a reliability requirement for a packet to be transmitted to a base station 360. The reliability requirement is determined based at least in part on a consecutive packet loss associated with at least one previously transmitted packet. At step 1604, the wireless device transmits the packet to the base station 360 based on the reliability requirement.

Figure 26:
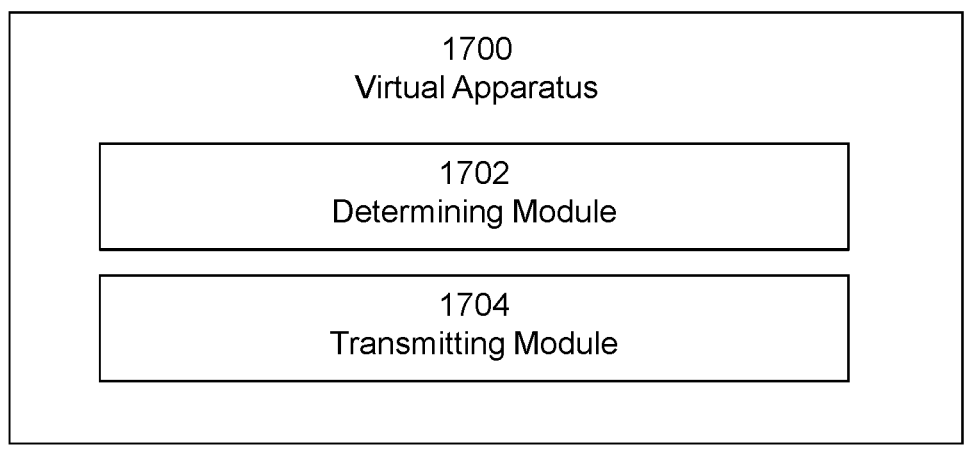
FIG. 26 illustrates another exemplary virtual computing device, according to certain embodiments.

FIG. 26 illustrates a schematic block diagram of a virtual apparatus 1700 in a wireless network (for example, the wireless network shown in FIG. 10). The apparatus may be implemented in a wireless device or network node (e.g., wireless device 310 or network node 360 shown in FIG. 10). Apparatus 1700 is operable to carry out the example method described with reference to FIG. 21 and possibly any other processes or methods disclosed herein. It is also to be understood that the method of FIG. 21 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module 1702, transmitting module 1704, and any other suitable units of apparatus 1700 to perform corresponding functions according one or more embodiments of the present disclosure.

According to certain embodiments, determining module 1702 may perform certain of the determining functions of the apparatus 1700. For example, determining module 1702 may determine a reliability requirement for a packet to be transmitted to a network node 360, which may include a base station. The reliability requirement may be determined based at least in part on a consecutive packet loss associated with at least one previously transmitted packet.

According to certain embodiments, transmitting module 1704 may perform certain of the transmitting functions of the apparatus 1700. For example, transmitting module 1704 may transmit the packet to the base station based on the reliability requirement.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

Example Embodiment 1. A method performed by a base station for improving network efficiency, the method comprising: determining a reliability requirement for a packet to be transmitted to a wireless device, the reliability requirement determined based at least in part on a consecutive packet loss associated with at least one previously transmitted packet; and based on the reliability requirement, transmitting, to the wireless device, the packet.

Example Embodiment 2. The method of Embodiment 1, wherein the packet is a retransmission of the at least one previously transmitted packet.

Example Embodiment 3. The method of Embodiment 2, wherein the retransmission comprises a PDCP, HARQ or RLC retransmission.

Example Embodiment 4. The method of any one of Embodiments 2 to 3, wherein determining the reliability requirement for the packet comprises determining that the retransmission of the previously transmitted packet will not arrive too late.

Example Embodiment 5. The method of any one of Embodiments 1 to 4, wherein the packet and the at least one previously transmitted packet are within a same data flow.

Example Embodiment 6. The method of any one of Embodiments 1 to 5, further comprising adjusting a BLER target of the packet based on the reliability requirement.

Example Embodiment 7. The method of any one of Embodiments 1 to 6, wherein the consecutive packet loss associated with the at least one previously transmitted packet comprises at least one of: a number of packets that can be lost while maintaining a desired level of Quality of Service; and a current consecutive packet success rate of a data flow associated with the packet.

Example Embodiment 8. The method of any one of Embodiments 1 to 7, wherein the reliability requirement comprises a survival time window during which a desired level of Quality of Service must be fulfilled.

Example Embodiment 9. The method of Embodiment 8, further comprising determining a number of packets that can be lost during the survival time window.

Example Embodiment 10. The method of any one of Embodiments 8 to 9, wherein the survival time window comprises a sum of a transfer time or packet delay budget of the packet and a survival time of an application.

Example Embodiment 11. The method of Embodiment 10, further comprising obtaining the survival time window as part of a QCI profile configuration associated with a bearer set up to carry a flow associated with the packet.

Example Embodiment 12. The method of any one of Embodiments 1 to 11, wherein determining the reliability requirement for the packet to be transmitted to the wireless device comprises determining an estimated number of remaining transmissions within a survival time window and determining that the transmission of the second packet will not exceed the estimated number of remaining transmissions within the survival time window.

Example Embodiment 13. The method of any one of Embodiments 1 to 12, further comprising adjusting a MCS of the packet based on the reliability requirement.

Example Embodiment 14. The method of any one of Embodiments 1 to 13, further comprising determining that the transmission of the packet was unsuccessful and determining how many re-transmissions of the packet can be afforded and/or whether to increase or decrease a MCS for any re-transmissions of the packet.

Example Embodiment 15. The method of any one of Embodiments 1 to 14, further comprising adjusting a transmit power of the packet and retransmitting the packet.

Example Embodiment 16. The method of any one of Embodiments 1 to 15, further comprising blanking an interfering transmission point and retransmitting the packet.

Example Embodiment 17. The method of any one of Embodiments 1 to 16, further comprising retransmitting the packet from multiple transmission points.

Example Embodiment 18. The method of any one of Embodiments 1 to 17, further comprising determining that a threshold number of unsuccessful transmissions have occurred and taking at least one action selected from: triggering an alarm; triggering a notification; and gathering statistics related to packet loss.

Example Embodiment 19. The method of any one of Embodiments 1 to 18, further comprising determining that the packet was transmitted unsuccessfully and prioritizing a retransmission of the packet to the wireless device over a transmission of another packet to another wireless device.

Example Embodiment 20. The method of any one of Embodiments 1 to 19, further comprising determining that the packet was transmitted unsuccessfully and prioritizing a transmission of another packet to another wireless device over a retransmission of the packet to the wireless device.

Example Embodiment 21. The method of any one of Embodiments 1 to 20, wherein the network node comprises an eNB or gNB.

Example Embodiment 22. A base station for improving network efficiency, the base station comprising: processing circuitry configured to perform any of the steps of any of Example Embodiments 1 to 20; power supply circuitry configured to supply power to the wireless device.

Example Embodiment 23. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of Example Embodiments 1 to 20.

Example Embodiment 24. The communication system of the pervious embodiment further including the base station.

Example Embodiment 25. The communication system of the previous 2 embodiments, further including the UE, wherein the UE is configured to communicate with the base station.

Example Embodiment 26. The communication system of the previous 3 embodiments, wherein: the processing circuitry of the host computer is configured to execute a host application, thereby providing the user data; and the UE comprises processing circuitry configured to execute a client application associated with the host application.

Example Embodiment 27. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of Example Embodiments 1 to 20.

Example Embodiment 28. The method of the previous embodiment, further comprising, at the base station, transmitting the user data.

Example Embodiment 29. The method of the previous 2 embodiments, wherein the user data is provided at the host computer by executing a host application, the method further comprising, at the UE, executing a client application associated with the host application.

Example Embodiment 30. A user equipment (UE) configured to communicate with a base station, the UE comprising a radio interface and processing circuitry configured to performs the of the previous 3 embodiments.

Example Embodiment 31. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of Example Embodiments 1 to 20.

Example Embodiment 32. The communication system of the previous embodiment further including the base station.

Example Embodiment 33. The communication system of the previous 2 embodiments, further including the UE, wherein the UE is configured to communicate with the base station.

Example Embodiment 34. The communication system of the previous 3 embodiments, wherein: the processing circuitry of the host computer is configured to execute a host application; the UE is configured to execute a client application associated with the host application, thereby providing the user data to be received by the host computer.

Example Embodiment 35. A method performed by a UE for improving network efficiency, the method comprising: determining a reliability requirement for a packet to be transmitted to a base station, the reliability requirement determined based at least in part on a consecutive packet loss associated with at least one previously transmitted packet; and based on the reliability requirement, transmitting, to the base station, the packet.

Example Embodiment 36. The method of Embodiment 35, wherein the packet is a retransmission of the at least one previously transmitted packet.

Example Embodiment 37. The method of Embodiment 36, wherein the retransmission comprises a PDCP, HARQ or RLC retransmission.

Example Embodiment 38. The method of any one of Embodiments 35 to 37, wherein determining the reliability requirement for the packet comprises determining that the retransmission of the previously transmitted packet will not arrive too late.

Example Embodiment 39. The method of any one of Embodiments 35 to 38, wherein the packet and the at least one previously transmitted packet are within a same data flow.

Example Embodiment 40. The method of any one of Embodiments 35 to 39, further comprising adjusting a BLER target of the packet based on the reliability requirement.

Example Embodiment 41. The method of any one of Embodiments 35 to 40, wherein the consecutive packet loss associated with the at least one previously transmitted packet comprises at least one of: a number of packets that can be lost while maintaining a desired level of Quality of Service; and a current consecutive packet success rate of a data flow associated with the packet.

Example Embodiment 42. The method of any one of Embodiments 35 to 41, wherein the reliability requirement comprises a survival time window during which a desired level of Quality of Service must be fulfilled.

Example Embodiment 43. The method of Embodiment 42, further comprising determining a number of packets that can be lost during the survival time window.

Example Embodiment 44. The method of any one of Embodiments 42 to 43, wherein the survival time window comprises a sum of a transfer time or packet delay budget of the packet and a survival time of an application.

Example Embodiment 45. The method of Embodiment 44, further comprising obtaining the survival time window as part of a QCI profile configuration associated with a bearer set up to carry a flow associated with the packet.

Example Embodiment 46. The method of any one of Embodiments 35 to 45, wherein determining the reliability requirement for the packet to be transmitted to the base station comprises determining an estimated number of remaining transmissions within a survival time window and determining that the transmission of the second packet will not exceed the estimated number of remaining transmissions within the survival time window.

Example Embodiment 47. The method of any one of Embodiments 35 to 46, further comprising adjusting a MCS of the packet based on the reliability requirement.

Example Embodiment 48. The method of any one of Embodiments 35 to 47, further comprising determining that the transmission of the packet was unsuccessful and determining how many re-transmissions of the packet can be afforded and/or whether to increase or decrease a MCS for any re-transmissions of the packet.

Example Embodiment 49. The method of any one of Embodiments 35 to 48, further comprising adjusting a transmit power of the packet and retransmitting the packet.

Example Embodiment 50. The method of any one of Embodiments 35 to 49, further comprising blanking an interfering transmission point and retransmitting the packet.

Example Embodiment 51. The method of any one of Embodiments 35 to 50, further comprising retransmitting the packet from multiple transmission points.

Example Embodiment 52. The method of any one of Embodiments 35 to 51, further comprising determining that a threshold number of unsuccessful transmissions have occurred and taking at least one action selected from: triggering an alarm; triggering a notification; and gathering statistics related to packet loss.

Example Embodiment 53. The method of any one of Embodiments 35 to 52, further comprising determining that the packet was transmitted unsuccessfully and prioritizing a retransmission of the packet to the base station over a transmission of another packet to another base station.

Example Embodiment 54. The method of any one of Embodiments 35 to 53, further comprising determining that the packet was transmitted unsuccessfully and prioritizing a transmission of another packet to another base station over a retransmission of the packet to the base station.

Example Embodiment 55. A wireless device for improving network efficiency, the wireless device comprising: processing circuitry configured to perform any of the steps of any of Example Embodiments 35 to 54; and power supply circuitry configured to supply power to the wireless device.

Example Embodiment 56. A user equipment (UE) for improving network efficiency, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of Example Embodiments 35 to 54; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example Embodiment 57. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of Example Embodiments 35 to 54.

Example Embodiment 58. The communication system of the previous embodiment, wherein the cellular network further includes a base station configured to communicate with the UE.

Example Embodiment 59. The communication system of the previous 2 embodiments, wherein: the processing circuitry of the host computer is configured to execute a host application, thereby providing the user data; and the UE's processing circuitry is configured to execute a client application associated with the host application.

Example Embodiment 60. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of Example Embodiments 35 to 54.

Example Embodiment 61. The method of the previous embodiment, further comprising at the UE, receiving the user data from the base station.

Example Embodiment 62. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of Example Embodiments 35 to 54.

Example Embodiment 63. The communication system of the previous embodiment, further including the UE.

Example Embodiment 64. The communication system of the previous 2 embodiments, further including the base station, wherein the base station comprises a radio interface configured to communicate with the UE and a communication interface configured to forward to the host computer the user data carried by a transmission from the UE to the base station.

Example Embodiment 65. The communication system of the previous 3 embodiments, wherein: the processing circuitry of the host computer is configured to execute a host application; and the UE's processing circuitry is configured to execute a client application associated with the host application, thereby providing the user data.

Example Embodiment 66. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Example Embodiment 67. A method implemented in a communication system including a host computer, a base station and a user equipment (UE), the method comprising: at the host computer, receiving user data transmitted to the base station from the UE, wherein the UE performs any of the steps of any of Example Embodiments 35 to 54.

Example Embodiment 68. The method of the previous embodiment, further comprising, at the UE, providing the user data to the base station.

Example Embodiment 69. The method of the previous 2 embodiments, further comprising: at the UE, executing a client application, thereby providing the user data to be transmitted; and at the host computer, executing a host application associated with the client application.

Example Embodiment 70. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Example Embodiment 71. A method implemented in a communication system including a host computer, a base station and a user equipment (UE), the method comprising: at the host computer, receiving, from the base station, user data originating from a transmission which the base station has received from the UE, wherein the UE performs any of the steps of any of Example Embodiments 35 to 54.

Example Embodiment 72. The method of the previous embodiment, further comprising at the base station, receiving the user data from the UE.

Example Embodiment 73. The method of the previous 2 embodiments, further comprising at the base station, initiating a transmission of the received user data to the host computer.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a base station, the method comprising:
    determining a reliability requirement for a packet to be transmitted to a wireless device, the reliability requirement determined based at least in part on a consecutive packet loss associated with at least one previously transmitted packet, wherein determining the reliability requirement for the packet to be transmitted to the wireless device comprises determining an estimated number of remaining transmissions to be transmitted within a survival time window and determining the reliability requirement based on the estimated number of remaining transmissions, wherein the estimated number of remaining transmissions is determined based at least on the survival time window and estimating how many consecutive packets can be afforded to be lost before exceeding a maximum threshold number of consecutive packets is lost during the survival time window while the reliability requirement is fulfilled; and based on the reliability requirement, transmitting the packet to the wireless device.

2. The method of claim 1, wherein the reliability requirement comprises a survival time window during which a desired level of quality of service, QoS, must be fulfilled, wherein when meeting the desired level of QoS at least one packet is successfully delivered during the survival time window.

3. The method of claim 2, further comprising determining a number of packets that can be lost during the survival time window.

4. The method of claim 2, wherein the survival time window comprises a sum of a transfer time or packet delay budget of the packet and a survival time of an application.

5. The method of claim 2, further comprising obtaining the survival time window as part of a QoS profile configuration.

6. The method of claim 5, wherein the QoS profile configuration is associated with a bearer set up to carry a flow associated with the packet.

7. The method of claim 2, wherein the packet is a new data packet within a data flow including the at least one previously transmitted packet.

8. The method of claim 1, further comprising adjusting a Block Error Rate, BLER, target of the packet based on the reliability requirement.

9. The method of claim 1, further comprising adjusting a Modulation and Coding Scheme, MCS, of the packet based on the reliability requirement, wherein adjusting the MCS of the packet based on the reliability requirement comprises:
determining that the transmission of the packet was unsuccessful; and
determining how many re-transmissions of the packet can be afforded to be performed; and/or
determining whether to increase or decrease a MCS for any re-transmissions of the packet.

10. The method of claim 1, further comprising determining that the transmission of the at least one previously transmitted packet was unsuccessful and determining the reliability requirement based on the transmission of at least one previously transmitted packet being unsuccessful.

11. A base station comprising:
processing circuitry configured to:
determine reliability requirement for a packet to be transmitted to a wireless device, the reliability requirement determined based at least in part on a consecutive packet loss associated with at least one previously transmitted packet, wherein when determining the reliability requirement for the packet to be transmitted to the wireless device the processing circuitry is configured to determine an estimated number of remaining transmissions to be transmitted within a survival time window and determine the reliability requirement based on the estimated number of remaining transmissions, wherein the estimated number of remaining transmissions is determined based at least on the survival time window and estimating how many consecutive packets can be afforded to be lost before exceeding a maximum threshold number of consecutive packets is lost during the survival time window while the reliability requirement is fulfilled; and
based on the reliability requirement, transmit the packet to the wireless device.

12. The base station of claim 11, wherein the reliability requirement comprises a survival time window during which a desired level of quality of service, QoS, must be fulfilled, wherein when meeting the desired level of QoS at least one packet is successfully delivered during the survival time window.

13. The base station of claim 12, wherein the processing circuitry is configured to determine a number of packets that can be lost during the survival time window.

14. The base station of claim 12, wherein the survival time window comprises a sum of a transfer time or packet delay budget of the packet and a survival time of an application.

15. The base station of claim 12, wherein the processing circuitry is configured to obtain the survival time window as part of a QoS profile configuration.

16. The base station of claim 15, wherein the QoS profile configuration is associated with a bearer set up to carry a flow associated with the packet.

17. The base station of claim 11, wherein the packet is a new data packet within a data flow including the at least one previously transmitted packet.

18. The base station of claim 11, wherein the processing circuitry is configured to adjust a Block Error Rate, BLER, target of the packet based on the reliability requirement.

19. The base station of claim 11, wherein the processing circuitry is configured to adjust a Modulation and Coding Scheme, MCS, of the packet based on the reliability requirement, wherein the processing circuitry configured to adjust the MCS of the packet based on the reliability requirement comprises a processing circuitry configured to:
determine that the transmission of the packet was unsuccessful; and
determine how many re-transmissions of the packet can be afforded to be performed; and/or
determine whether to increase or decrease a MCS for any re-transmissions of the packet.

20. The base station of claim 11, wherein the processing circuitry is configured to determine that the transmission of the at least one previously transmitted packet was unsuccessful and determining the reliability requirement based on the transmission of at least one previously transmitted packet being unsuccessful.

* * * * *